(12) United States Patent
Ohlsson et al.

(10) Patent No.: US 11,115,822 B2
(45) Date of Patent: *Sep. 7, 2021

(54) RADIO ACCESS CAPABILITIES OF A WIRELESS DEVICE

(71) Applicant: TELEFONAKTIEBOLAGET LM ERICSSON (PUBL), Stockholm (SE)

(72) Inventors: Oscar Ohlsson, Bromma (SE); Magnus Stattin, Upplands Väsby (SE); Prajwol Kumar Nakarmi, Sollentuna (SE); Peter Hedman, Helsingborg (SE); Malik Wahaj Arshad, Upplands Väsby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/160,117

(22) Filed: Jan. 27, 2021

(65) Prior Publication Data

US 2021/0153022 A1    May 20, 2021

Related U.S. Application Data

(63) Continuation of application No. 17/257,135, filed as application No. PCT/EP2020/050492 on Jan. 10, 2020.

(Continued)

(51) Int. Cl.
*H04W 12/106* (2021.01)
*H04W 8/24* (2009.01)

(52) U.S. Cl.
CPC ........... *H04W 12/106* (2021.01); *H04W 8/24* (2013.01)

(58) Field of Classification Search
CPC . H04L 63/20; H04L 63/1441; H04L 63/1466; H04L 69/24; H04L 9/088;
(Continued)

(56) References Cited

U.S. PATENT DOCUMENTS

| 2013/0010701 A1* | 1/2013 | Uchiyama | H04W 8/22 370/328 |
| 2018/0324594 A1* | 11/2018 | Chen | H04L 9/3242 |

OTHER PUBLICATIONS

3GPP, "3GPP TS 36.300 V15.2.0", 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15), Jun. 2018, 1-357.

(Continued)

*Primary Examiner* — Quoc Thai N Vu

(57) ABSTRACT

A network node is configured for use in a wireless communication network. The network node is configured to acquire radio access capability information of a wireless device. The radio access capability information of the wireless device indicates radio access capabilities of the wireless device. The network node is configured to determine if the wireless communication network received the radio access capability information of the wireless device before access stratum security was activated for the wireless device. If the wireless communication network received the radio access capability information of the wireless device before access stratum security was activated for the wireless device according to that determination, the network node is configured to re-acquire the radio access capability information of the wireless device after access stratum security is activated for the wireless device.

29 Claims, 33 Drawing Sheets

Related U.S. Application Data

(60) Provisional application No. 62/792,592, filed on Jan. 15, 2019.

(58) Field of Classification Search
CPC .... H04L 9/3242; H04W 8/24; H04W 12/106; H04W 12/06; H04W 12/08; H04W 12/122; H04W 36/0038; H04W 12/02; H04W 12/04; H04W 12/37; H04W 60/00
See application file for complete search history.

(56) References Cited

OTHER PUBLICATIONS

3GPP, "3GPP TS 36.300 V15.3.0", 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15), Sep. 2018, 1-358.

3GPP, "3GPP TS 38.300 V15.3.1", 3rd Generation Partnership Project; Technical Specification Group Radio Access Network; NR; NR and NG-RAN Overall Description; Stage 2 (Release 15), Oct. 2018, 1-92.

3GPP, "3rd Generation Partnership Project; Technical Specification Group Radio Access Network; NR; NR and NG-RAN Overall Description; Stage 2 (Release 15)", 3GPP TS 38.300 V15.1.0, Mar. 2018, 1-71.

3GPP, "3rd Generation Partnership Project; Technical Specification Group Services and System Aspects; Security architecture and procedures for 5G system (Release 15)", 3GPP TS 33.501 V15.2.0 (Sep. 2018), Sep. 2018, 1-175.

3GPP, "3rd Generation Partnership Project; Technical Specification Group Services and System Aspects; Study on optimisations of UE radio capability signalling (Release 16)", 3GPP TR 23.743 V1.0.0, Dec. 2018, 1-52.

Ericsson, "KI#1 in TR 33.809—new requirement and solution for UECapabilityInformation RRC message", 3GPP TSG SA WG3 (Security) Meeting #94, S3-19xxxx, revision of S3-19xabc, Kochi (India), Jan. 28-Feb. 1, 2019, 1-3.

Ericsson, "KI#1 in TR 33.809—new requirement and solution for UECapabilityInformation RRC message", 3GPP TSG SA WG3 (Security) Meeting #94, S3-190554, revision of S3-190275, Kochi (India), Jan. 28-Feb. 1, 2019, 1-3.

Ericsson, "Security of RRC UE capability transfer procedure in 5GS", 3GPP TSG-SA WG3 Meeting #96, S3-192862, Wroclaw (Poland), Aug. 26-30, 2019, 1-2.

Ericsson, "Security of RRC UE capability transfer procedure in EPS", 3GPP TSG-SA WG3 Meeting #96, S3-194243, Wroclaw (Poland), Aug. 26-30, 2019, 1-2.

Qualcomm Incorporated, "Discussion on some solution of the 4G bidding down attacks", 3GPP TSG SA WG3 (Security) Meeting #83, S3-160559 (revision of S3-13abcd, San Jose de los Cabos (Mexico), May 9-13, 2016, 1-2.

Shaik, Altaf, et al., "Practical Attacks Against Privacy and Availability in 4G/LTE Mobile Communication Systems", NDSS '16; San Diego, CA; http://dx.doi.org/10.14722/ndss.2016.23236, Feb. 21-24, 2016, 1-16.

\* cited by examiner

```
┌─────────────────────────────────────────────┐
│  RECEIVE, FROM ANOTHER NETWORK NODE, CONTROL │
│  SIGNALING INDICATING THAT RADIO ACCESS      │
│  CAPABILITY INFORMATION WAS RECEIVED FROM A  │
│  WIRELESS DEVICE BEFORE ACCESS STRATUM       │
│  SECURITY WAS ACTIVATED, HAS NOT HAD ITS     │
│  INTEGRITY VERIFIED, AND/OR WAS RECEIVED     │
│  FROM THE WIRELESS DEVICE WITHOUT            │
│  CONFIDENTIALITY PROTECTION                  │
│                    800                       │
└─────────────────────────────────────────────┘
                     │
                     ▼
┌─────────────────────────────────────────────┐
│  RECEIVE THE RADIO ACCESS CAPABILITY         │
│  INFORMATION FROM THE ANOTHER NETWORK NODE   │
│                    810                       │
└─────────────────────────────────────────────┘
                     │
                     ▼
┌─────────────────────────────────────────────┐
│  REQUESTING RADIO ACCESS CAPABILITY          │
│  INFORMATION FROM THE WIRELESS DEVICE AFTER  │
│  ACTIVATION OF ACCESS STRATUM SECURITY, OR   │
│  ACCEPTING RADIO ACCESS CAPABILITY           │
│  INFORMATION RECEIVED FROM THE ANOTHER       │
│  NETWORK NODE, DEPENDING ON THE CONTROL      │
│  SIGNALING                                   │
│                    820                       │
└─────────────────────────────────────────────┘
                     │
                     ▼
┌─────────────────────────────────────────────┐
│  STORING OR REFRAINING FROM STORING THE      │
│  RECEIVED RADIO ACCESS CAPABILITY            │
│  INFORMATION AT THE NETWORK NODE, DEPENDING  │
│  ON THE CONTROL SIGNALING                    │
│                    830                       │
└─────────────────────────────────────────────┘
```

*FIGURE 8*

RADIO ACCESS CAPABILITIES OF A WIRELESS DEVICE

CROSS REFERENCE TO RELATED APPLICATIONS

This application is a continuation of U.S. patent application Ser. No. 17/257,135 filed Dec. 30, 2020, which is a 35 U.S.C. § 371 national stage application of PCT International Application No. PCT/EP2020/050492, filed on Jan. 10, 2020, which itself claims priority to U.S. Provisional Application No. 62/792,592 filed Jan. 15, 2019, the disclosure and content of both of which are incorporated herein by reference in their entireties.

TECHNICAL FIELD

The present application relates generally to wireless communication, and relates more particularly to radio access capabilities of a wireless device.

BACKGROUND

A wireless device informs a wireless communication network of the device's capabilities upon attaching to the network and/or at other times, so that the device and network can communicate using parameters within the device's capability. The device's capabilities can be classified into two categories depending on which layer of the protocol hierarchy the capabilities are related to. The access stratum (AS) level capabilities are access technology dependent parts of the capability information, such as device power class and supported frequency bands. The AS capabilities are used by the radio access network. The AS capabilities may therefore also be appropriately referred to as radio access capabilities. The non-access stratum (NAS) level capabilities are the capabilities which are not access related, such as supported security algorithms. The NAS capabilities are used by the core network.

A wireless device heretofore unconditionally provides its radio access capabilities to the radio access network when the radio access network asks for those capabilities. Although this approach allows for early optimization of service/connectivity based on the radio access capabilities, the approach may carry with it security and/or privacy risks.

SUMMARY

Some embodiments herein ensure the integrity and/or confidentiality of radio access capability information that a wireless communication network receives, stores, and/or uses. These and other embodiments may therefore safeguard the network from security attacks (e.g., man-in-the-middle attacks) on the radio access capability information and/or protect users from being tracked using such information.

According to one or more embodiments, for instance, a wireless device transmits and/or a radio network node requests (at least some) radio access capability information only upon or after activation of access stratum (AS) security. In this case, then, the radio access capability information is proactively transmitted with integrity protection. In some embodiments, the radio access capability information that is transmitted upon or after AS security activation constitutes all of the radio access capability information that the wireless device is to transmit. In other embodiments, though, the radio access capability information that is transmitted upon or after AS security activation constitutes just a portion of the radio access capability information that the wireless device is to transmit, with another (e.g., less-sensitive) portion of the information being transmitted before AS security activation.

Alternatively or additionally, the wireless device and/or the radio network node in one or more embodiments retroactively check whether the radio access capability information was received by the network with the information's integrity intact. For example, the network may transmit a derivative (e.g., hash) of the received information back to the wireless device so that the device can check the integrity of the information the network received, and perhaps report integrity problems to the network as needed. This and other embodiments for retroactive integrity check may therefore ensure that the network does not store and/or otherwise use radio access capability information that was not received with its integrity intact, while at the same time in some embodiments not imposing a requirement that the information's transmission be delayed until AS security activation.

Still other embodiments effectively tag, flag, taint, or otherwise mark radio access capability information as having been received by the wireless communication network before AS security activation, as not having its integrity verified, and/or as being transmitted over-the-air without confidentiality protection. Such a tag, flag, taint, or mark therefore functions as a warning to any node in the network that the information is subject to the potential of tampering and/or leakage. This way, nodes in the network may handle the radio access capability information accordingly. For example, in some embodiments, the network may permit time-limited storage and/or use of the information if it the information is tagged, tainted, or marked as described above, but may effectively flush the information after the occurrence of certain events and/or time durations, so that the information (in case it was tampered with or leaked) does not propagate and/or have long-term impact. In another example, some network nodes may trigger re-acquisition of the radio access capability information from the device if it was tagged, tainted, or marked.

Broadly, then, some embodiments herein include a method performed by a network node in a wireless communication network. The method includes acquiring radio access capability information of a wireless device, wherein the radio access capability information of the wireless device indicates radio access capabilities of the wireless device. The method may also include determining if the wireless communication network received the radio access capability information of the wireless device before access stratum security was activated for the wireless device. The method may further include, if the wireless communication network received the radio access capability information of the wireless device before access stratum security was activated for the wireless device according to said determining, re-acquiring the radio access capability information of the wireless device after access stratum security is activated for the wireless device.

In some embodiments, the method further comprises determining whether or not to re-acquire the radio access capability information of the wireless device after access stratum security is activated for the wireless device, depending respectively on whether or not the wireless communication network received the radio access capability information of the wireless device before access stratum security was activated for the wireless device.

Alternatively or additionally, the method may further comprise determining whether or not to store the radio access capability information of the wireless device at the network node, depending respectively on whether the wireless communication network received the radio access capability information of the wireless device after or before access stratum security was activated for the wireless device.

Alternatively or additionally, the method may also comprise determining whether or not to forward the radio access capability information of the wireless device from the network node to another network node, depending respectively on whether the wireless communication network received the radio access capability information of the wireless device after or before access stratum security was activated for the wireless device.

In some embodiments, the method further comprises, if the wireless communication network received the radio access capability information of the wireless device before access stratum security was activated for the wireless device, refraining from storing the radio access capability information at the network node and/or refraining from forwarding the radio access capability information from the network node to another network node.

In some embodiments, re-acquiring the radio access capability information of the wireless device after access stratum security is activated for the wireless device comprises, after access stratum security is activated for the wireless device: (i) transmitting to the wireless device a capability enquiry which requests the radio access capability information of the wireless device; and (ii) receiving the radio access capability information of the wireless device as a response to the capability enquiry.

In some embodiments, re-acquiring the radio access capability information of the wireless device comprises receiving the radio access capability information of the wireless device over a control plane connection after access stratum security is activated for securing the control plane connection. In one such embodiment, the control plane connection is a Radio Resource Control, RRC, connection.

In some embodiments, re-acquiring the radio access capability information of the wireless device after access stratum security is activated for the wireless device comprises retrieving the radio access capability information of the wireless device using a Radio Resource Control, RRC, User Equipment, UE, capability transfer procedure after successfully performing an Access Stratum Security Mode Command, SMC, procedure.

In some embodiments, the method further comprises including, together with the radio access capability information, an indication that indicates whether the radio access capability information was received before access stratum security was activated.

In some embodiments, the method further comprises transmitting, to another network node, control signaling indicating whether the radio access capability information was received before access stratum security was activated, has not had its integrity verified, and/or was received from the wireless device without confidentiality protection.

In some embodiments, the radio access capability information comprises: one of multiple Radio Resource Control, RRC, segments that indicate the radio access capabilities of the wireless device; or an identifier mapped to the radio access capabilities of the wireless device.

In some embodiments, the network node is a New Radio node B, gNB, a Next Generation Evolved Node B, ng-eNB or an Evolved Node B, eNB.

Other embodiments herein include a method performed by a network node in a wireless communication network. The method comprises receiving radio access capability information indicating radio access capabilities of a wireless device. The method may also comprise deriving a derivative of the received radio access capability information. The method may further comprise receiving a derivative of radio access capability information transmitted by the wireless device. The method may then comprise verifying whether or not the derived derivative matches the received derivative.

In some embodiments, the method comprises receiving the received derivative within a message that is integrity protected and/or confidentiality protected, and receiving the radio access capability information from the wireless device over a control plane connection before access stratum security is activated over the control plane connection.

In some embodiments, the derived derivative is a hash of the received radio access capability information.

In some embodiments, the method further comprises triggering radio resource control, RRC, connection re-establishment or non-access stratum recovery responsive to verifying the derived derivative does not match the received derivative.

In some embodiments, the radio access capability information comprises: one of multiple Radio Resource Control, RRC, segments that indicate the radio access capabilities of the wireless device; or an identifier mapped to the radio access capabilities of the wireless device.

Embodiments herein further include a method performed by a wireless device. The method comprises transmitting, to a wireless communication network, radio access capability information indicating radio access capabilities of the wireless device. The method further comprises deriving a derivative of the transmitted radio access capability information, and transmitting the derived derivative to the wireless communication network.

In some embodiments, the method comprises transmitting the derived derivative within a message that is integrity protected and/or confidentiality protected, and transmitting the radio access capability information over a control plane connection before access stratum security is activated over the control plane connection.

In some embodiments, the derived derivative is a hash of the transmitted radio access capability information.

In some embodiments, the radio access capability information comprises: one of multiple Radio Resource Control, RRC, segments that indicate the radio access capabilities of the wireless device; or an identifier mapped to the radio access capabilities of the wireless device.

Further aspects of the present invention are directed to an apparatus, network node, radio network node, wireless device, computer program products or computer readable storage medium corresponding to the methods summarized above and corresponding functional implementations.

For example, embodiments herein include a network node configured for use in a wireless communication network. The network node is configured (e.g., via communication circuitry and processing circuitry) to acquire radio access capability information of a wireless device, wherein the radio access capability information of the wireless device indicates radio access capabilities of the wireless device. The network node may be configured to determine if the wireless communication network received the radio access capability information of the wireless device before access stratum security was activated for the wireless device. The network node may further be configured to, if the wireless communication network received the radio access capability information of the wireless device before access stratum security was activated for the wireless device according to said determining, re-acquire the radio access capability information of the wireless device after access stratum security is activated for the wireless device.

Embodiments moreover include a network node configured for use in a wireless communication network. The network node is configured (e.g., via communication circuitry and processing circuitry) to receive radio access capability information indicating radio access capabilities of a wireless device. The network node may also be configured to derive a derivative of the received radio access capability information. The network node may further be configured to receive a derivative of radio access capability information transmitted by the wireless device. The network node may be configured to then verify whether or not the derived derivative matches the received derivative.

Embodiments also include a wireless device. The wireless device is configured (e.g., via communication circuitry and processing circuitry) to transmit, to a wireless communication network, radio access capability information indicating radio access capabilities of the wireless device. The wireless device is further configured to derive a derivative of the transmitted radio access capability information, and transmit the derived derivative to the wireless communication network.

BRIEF DESCRIPTION OF THE DRAWINGS

FIG. 8 is a logic flow diagram of a method performed by a network node in accordance with yet other embodiments.

DETAILED DESCRIPTION

Figure 1:
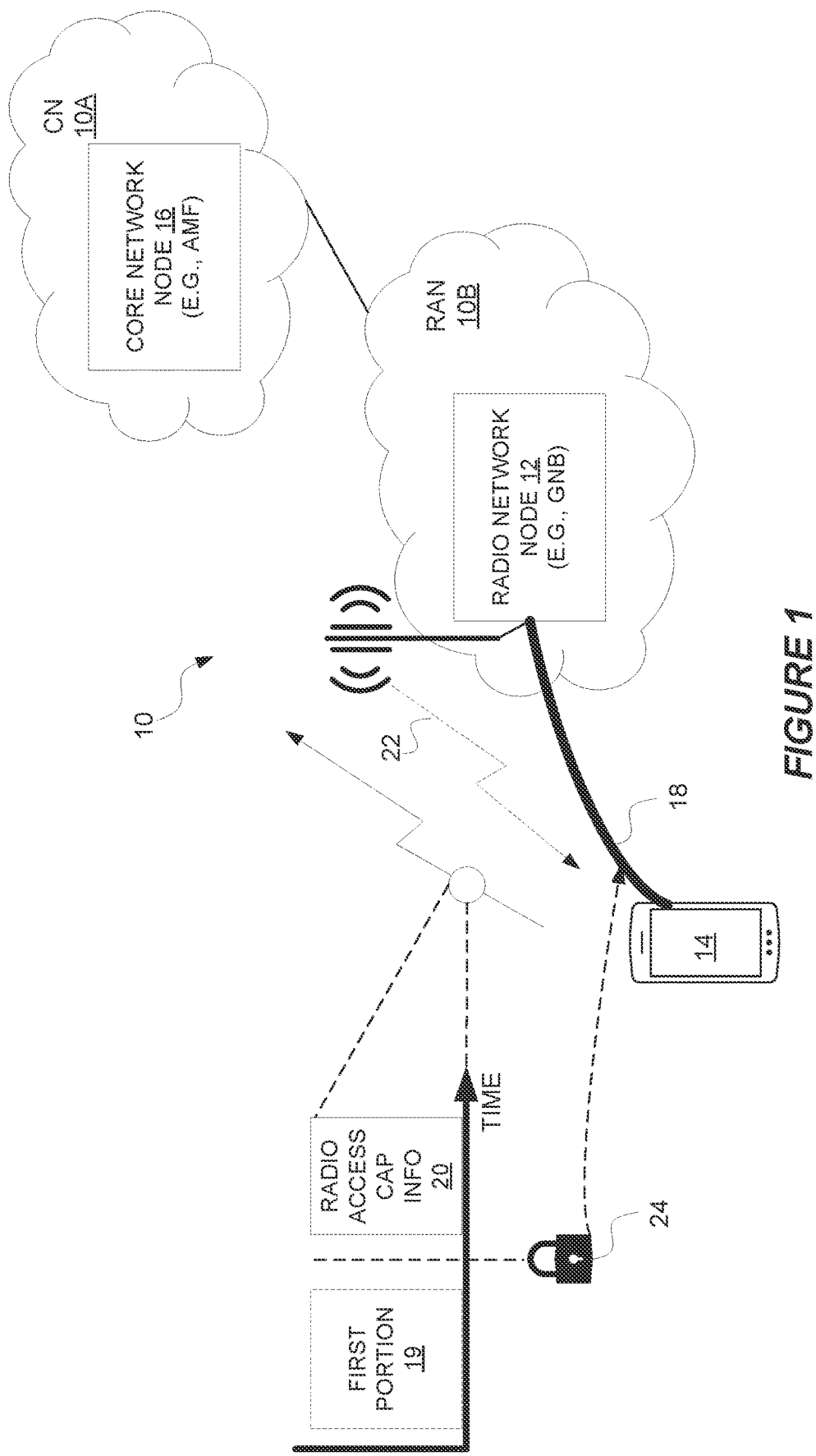
FIG. 1 is a block diagram of a wireless communication network according to some embodiments.

FIG. 1 shows a wireless communication network 10 (e.g., a 5G network) according to some embodiments. The network 10 includes a core network (CN) 10A and a radio access network (RAN) 10B. The RAN 10B includes one or more radio network nodes 12 (e.g., one or more base stations) for providing radio access to wireless communication devices 14 (also referred to simply as wireless device), one of which is shown. Via this radio access, a wireless device 14 connects to the CN 10A, which in turn may provide the wireless device 14 with access to one or more external networks, such as the Internet. The CN 10A for example may include different CN nodes, such as a node 16 which may for instance implement an access and mobility function, AMF.

From a protocol structure standpoint, the network 10 is divided into an access stratum (AS) and a non-access stratum (NAS). The AS contains protocols that handle activities between the wireless device 14 and the RAN 10B, e.g., for transporting data over a radio connection and managing radio resources. The NAS contains protocols that handle activities between the wireless communication device 14 and the CN 10A, e.g., for establishing communication sessions and maintaining continuous communications as the wireless device 14 moves. The network 10 is also divided into a user plane (UP) and a control plane (CP). The control plane contains protocols responsible for managing transport bearers, whereas the user plane contains protocols responsible for transporting user traffic.

FIG. 1 shows the wireless device 14 establishes a control plane connection 18 (e.g., in the form of a radio resource control, RRC, connection) between the wireless device 14 and radio network node 12. The wireless device 14 transmits so-called radio access capability information 20 to the radio network node 12 over this control plane connection 18, e.g., via one or more RRC messages transmitted over-the-air. Radio access capability information 20 is any type of information that indicates radio access capabilities of the wireless device 14. The information 20 may for instance indicate those capabilities explicitly using explicit parameter values, using multiple segments of capabilities information, using a (manufacturer-specific) identifier (e.g., capability ID) that encodes or maps to a set of capabilities, using compressed information, or the like. No matter the particular way the capabilities are indicated, the radio access capabilities of the wireless device 14 as used herein refer to the capabilities of the wireless device for communicating over the radio access with the RAN 10B. These radio access capabilities may also be referred to as AS capabilities. The radio access capabilities are therefore distinguished from the capabilities of the wireless device 14 with respect to communication with the CN 10A and/or over the NAS. In any event, radio access capabilities as indicated by the radio access capability information 20 may include, for example, frequency bands supported by the wireless device, discontinuous reception cycle lengths supported by the wireless device, feature group indicator information indicating support for different types of measurement reports, etc. Alternatively or additionally, the radio access capabilities may include one or more of: support for delay budget reporting, support for RRC_inactive state, support for UL transmission via either master cell group (MCG) path or secondary cell group (SCG) path for split signaling radio bearer (SRB), support for uplink (UL) transmission via both MCG path and SCG path for split data radio bearer (DRB), support for direct SRB between the serving network (SN) and UE, support for EUTRA vehicle to everything (V2X), support for IMS voice over NR PDCP for MCG bearer in NR, support for various PDCP parameters/features (e.g., PDCP duplication, out of order delivery, max number of header compression context sessions), support for RLC parameters/features (e.g., supported length(s) of RLC sequence number), MAC parameters/features (e.g., support for long discontinuous reception cycle lengths, support for configured grant configurations per cell group, support for skipping of uplink transmission for an uplink grant), and physical layer parameters/features (e.g., support frequency bands, supported band combinations, support for beam correspondence, support for extended cyclic prefix (CP), support for SRS antenna port switching, supported frequency separation class, supported PDCCH search space monitoring occasions, supported PDSCH mapping types, supported PDCCH blind decoding capabilities, supported PUCCH formats).

Regardless, some embodiments herein ensure the integrity and/or confidentiality of the radio access capability information 20 that the network 10 receives, stores, and/or uses. These and other embodiments may therefore safeguard the network 10 from man-in-the-middle attacks on the radio access capability information 20 and/or protect users from being tracked using such information.

According to one or more embodiments, for instance, the wireless device 14 and radio network node 12 activates AS security 24 for securing the control plane connection 18. This may involve taking into use security keys for activating or applying integrity protection and/or confidentiality protection over the control plane connection 18. After activating AS security 24, the wireless device 14 as shown in FIG. 1 transmits the radio access capability information 20 to the radio network node over the control plane connection 18. In some embodiments, therefore, the wireless device 14 transmits and/or the radio network node 12 receives radio access capability information 20 only upon or after activation of access stratum (AS) security 24. In this case, then, the radio access capability information 20 is proactively transmitted and received with integrity and/or confidentiality protection.

In some embodiments, the wireless device 14 transmits the radio access capability information 20 to the radio network node 12 in response to receiving a capability enquiry 22 from the radio network node 12 requesting the information 20.

In one or more embodiments, the wireless device 14 effectively enforces a policy that it will not transmit the radio access capability information 20 until after AS security activation, e.g., by delaying such transmission as needed to activate AS security 24 first. Even if the wireless device 14 receives the capability enquiry 22 before activation of AS security 24, for instance, the wireless device 14 in some embodiments refrains from responding to the enquiry 22 with the information 20 until after AS security activation. In one or more embodiments, then, responsive to receiving the capability enquiry 22, the wireless device 14 may check or verify whether access stratum security 24 is or has been activated for securing the control plane connection 18. If access stratum security 24 is or has been activated for securing the control plane connection 18 according to that check/verification, the wireless device 14 will transmit the radio access capability information 20 as a response to the capability enquiry 22. On the other hand, if access stratum security 24 is not or has not been activated for securing the control plane connection 18 according to that check/verification, the wireless device 14 according to some embodiments may transmit a radio access capability reject message (not shown) rejecting the request for radio access capabilities. Alternatively or additionally to rejecting the request, the wireless device 14 may trigger non-access stratum (NAS) recovery.

In other embodiments, by contrast, the radio network node 12 alternatively or additionally enforces the policy that the radio access capability information 20 is not to be transmitted over the air until after activation of AS security 24. In such a case, the radio network node 12 may refrain from transmitting the capability enquiry 22 until after activation of AS security 24. Correspondingly, the wireless device 14 may receive the capability enquiry 22 only upon or after activation of AS security 24.

In some embodiments, the radio access capability information 20 that is transmitted upon or after AS security activation constitutes all of the radio access capability information that the wireless device 14 is to transmit. In this case, then, the wireless device 14 may wait to transmit any radio access capability information (i.e., any type or amount of such information) until after activation of AS security 24.

In other embodiments, though, the radio access capability information 20 that is transmitted upon or after activation of AS security 24 constitutes just a portion of the radio access capability information that the wireless device 14 is to transmit, with another (e.g., less-sensitive) portion 19 of the information being transmitted before activation of AS security 24. In this case, the wireless device 14 in some embodiments transmits to the radio network node 12 over the control plane connection 18 a first portion 19 of radio access capability information before activating AS security 24. In some embodiments, this first portion 19 of radio access capability information includes information deemed less-sensitive and/or information deemed more impactful for early optimization. In one or more embodiments, the first portion 19 of information includes frequency bands supported by the wireless device 14, discontinuous reception cycle lengths supported by the wireless device 14, and/or feature group indicator information indicating support for different types of measurement reports. Regardless, upon or after activation of AS security 24, the wireless device 14 in such embodiments then transmits the radio access capability information 20 as a second portion of radio access capability information. Note that, in embodiments that transmit radio access capability as RRC segments, the first and second portions may each comprise one or more such RRC segments.

In some embodiments that communicate radio access capability information in portions, the radio network node 12 separately requests those respective portions before and after activation of AS security 24. For example, in some embodiments, the radio network node 12 transmits a first capability enquiry requesting the first portion 19 before activating AS security 24, and transmits a second capability enquiry (shown as enquiry 22 in FIG. 1) requesting the second portion after activating AS security 24.

Figure 2:
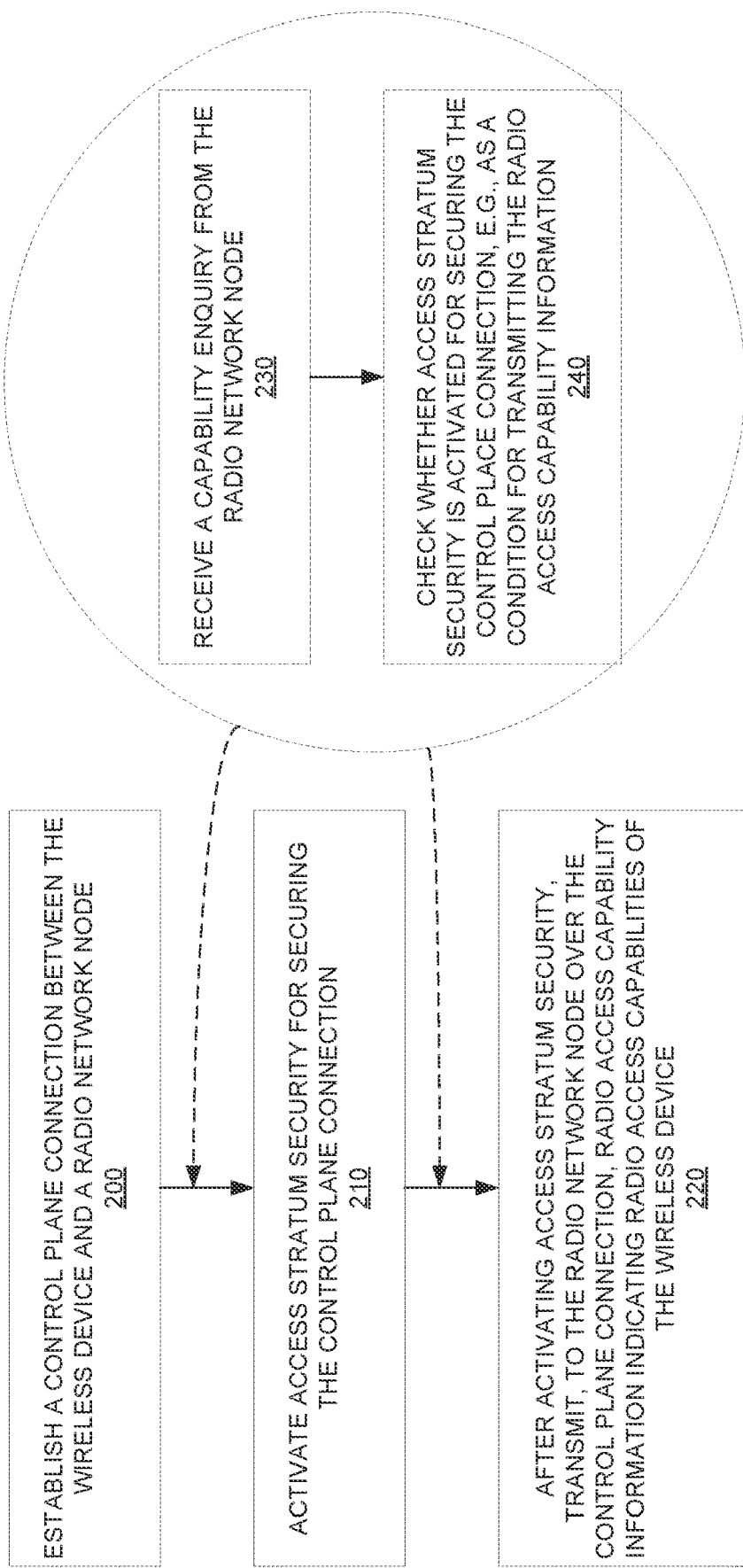
FIG. 2 is a logic flow diagram of a method performed by a wireless device in accordance with particular embodiments.

Generally, then, FIG. 2 depicts a method performed by a wireless device 14 in accordance with particular embodiments. The method includes establishing a control plane connection 18 between the wireless device 14 and a radio network node 12 (block 200) and activating access stratum security for securing the control plane connection 18 (block 210). The method also includes, after activating access stratum security for securing the control plane connection 18, transmitting, to the radio network node 12 over the control plane connection 18, radio access capability information 20 indicating radio access capabilities of the wireless device 14 (block 220).

In some embodiments, the method may further include receiving, from the radio network node 12, a capability enquiry 22 that requests radio access capabilities of the wireless device 12 (Block 230). In this case, the radio access capability information 20 may be transmitted in response to the capability enquiry 22.

That said, in some embodiments, the method may include, responsive to receiving the capability enquiry 22, checking whether access stratum security is activated for securing the control plane connection 18 (Block 240). The method in this case may include transmitting the radio access capability information 20 only if access stratum security is activated for securing the control plane connection 18 according to said checking. Accordingly, in some embodiments the method may further include, responsive to determining based on said checking that access stratum security is not activated for securing the control plane connection 18, transmitting a radio access capability reject message rejecting the request for radio access capabilities or triggering non-access stratum recovery.

In some embodiments, then, the capability enquiry 22 may be received before access stratum security has been activated; that is, Block 230 may occur before Block 210. In one or more embodiments when this occurs, the method may further include delaying transmission of the radio access capability information 20 until access stratum security has been activated. Such delay may involve for instance rejecting the enquiry 22 and transmitting the capability information only in response to a subsequent enquiry received after security activation. Or, the delay may involve waiting to transmit the capability information 20, without necessarily rejecting the enquiry, until after activation has occurred.

In other embodiments shown in FIG. 2, the capability enquiry 22 may be received upon or after activation of access stratum security; that is, Block 230 may occur upon or after Block 210.

Regardless of whether the capability information 20 is transmitted in response to an enquiry, in some embodiments, the method may involve waiting to transmit any radio access capability information until after activation of access stratum security. That is, the wireless device 14 refrains from transmitting any type or amount of radio access capability information until after activation, e.g., so as to safeguard all types or portions of such information.

In other embodiments, the method may include transmitting, to the radio network node 12 over the control plane connection 18, a first portion of radio access capability information before activating access stratum security, such that the radio access capability information 20 transmitted (in Block 220) over the control plane connection 18 after activating access stratum security is a second portion of radio access capability information. The first portion of radio access capability information may for example indicate one or more of: frequency bands supported by the wireless device; discontinuous reception cycle lengths supported by the wireless device 12; or feature group indicator information indicating support for different types of measurement reports. The first and second portions may be first and second radio resource control (RRC) segments.

In some embodiments, said activating comprises activating integrity protection and/or confidentiality protection on the control plane connection.

In some embodiments, the control plane connection 18 is an RRC connection, and the radio access capability information 20 is transmitted in one or more RRC messages. In some embodiments, the radio access capability information 20 comprises information explicitly indicating the radio access capabilities of the wireless device or comprises a manufacturer-specific capability identity mapped to the radio access capabilities of the wireless device 14.

Figure 3:
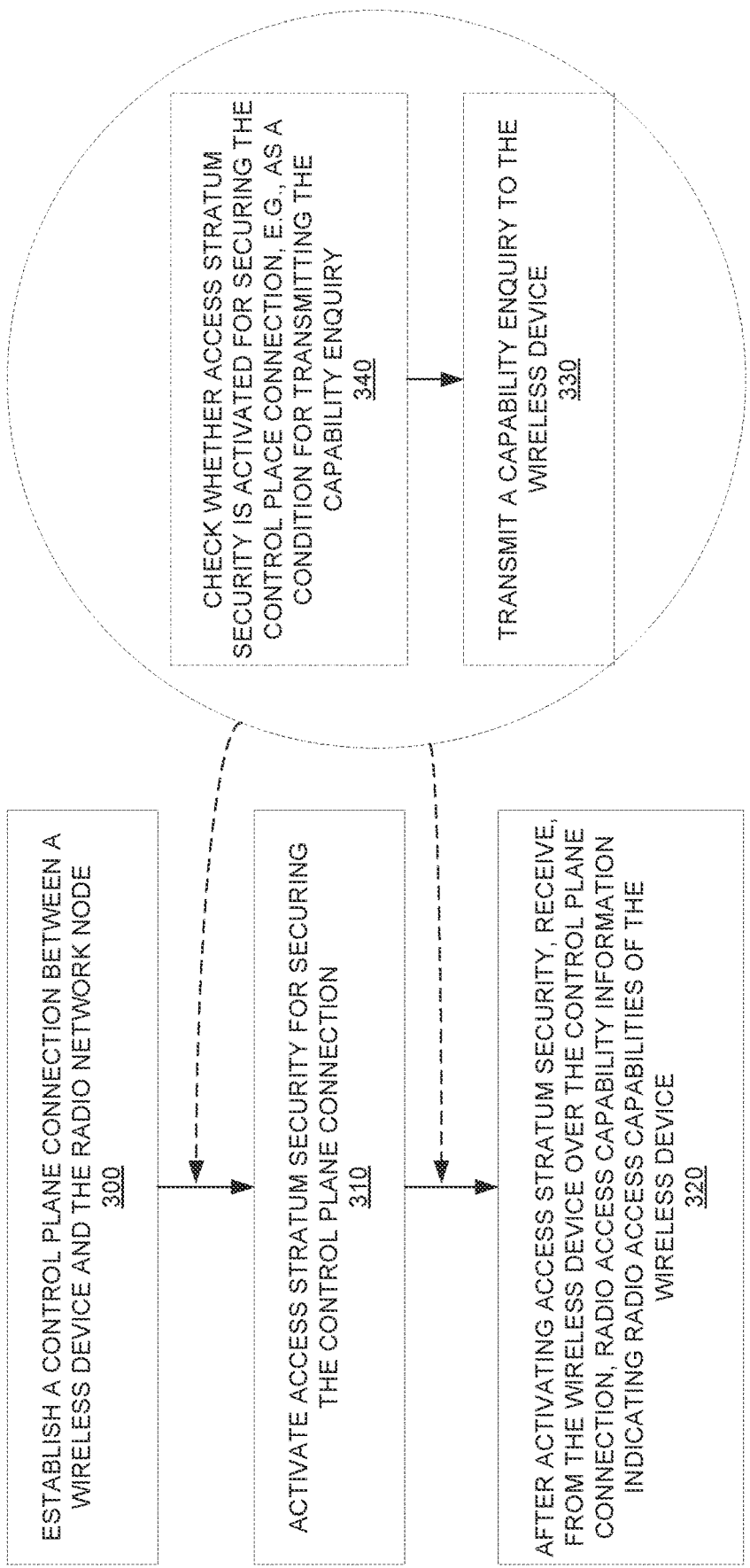
FIG. 3 is a logic flow diagram of a method performed by a network node in accordance with particular embodiments.

Generally in this regard, FIG. 3 depicts a method performed by a radio network node in accordance with other particular embodiments. The method includes establishing a control plane connection between a wireless device and the radio network node (block 300) and activating access stratum security for securing the control plane connection (block 310). The method further includes, after activating access stratum security, receiving, from the wireless device over the control plane connection, radio access capability information indicating radio access capabilities of the wireless device (block 320).

The method may include transmitting, from the radio network node to the wireless device, a capability enquiry that requests radio access capabilities of the wireless device (Block 330). In this case, the radio access capability information may be received in response to the capability enquiry.

In some embodiments, the capability enquiry is transmitted before activating access stratum security; that is Block 330 occurs before Block 310. In this case, then, radio access capability information may be received in Block 320 after activating access stratum security in Block 310, even though the capability enquiry was sent in Block 330 prior to activating access stratum security.

In other embodiments, the capability enquiry is transmitted only upon or after activating access stratum security. In fact, in some embodiments, the method may further include checking whether access stratum security is activated for securing the control plane connection (Block 340) and transmitting the capability enquiry may include transmitting the capability enquiry only if access stratum security is activated for securing the control plane connection according to said checking. The capability enquiry may be transmitted upon or after activation of access stratum security.

In some embodiments, the method may include waiting to transmit any capability enquiry until upon or after activation of access stratum security.

In other embodiments, the method may include, before activating access stratum security, transmitting, to the wireless device over the control plane connection, a first capability enquiry requesting a first portion of radio access capability information from the wireless device. The method may then include, after activating access stratum security, transmitting, to the wireless device over the control plane connection, a second capability enquiry requesting a second portion of radio access capability information from the wireless device. The radio access capability information received over the control plane connection after activating access stratum security may be the second portion of radio access capability information.

The method may correspondingly include receiving, from the wireless device over the control plane connection, a first portion of radio access capability information before activating access stratum security. The radio access capability information may be received over the control plane connection after activating access stratum security is a second portion of radio access capability information. In some embodiments, the first portion of radio access capability information indicates one or more of: frequency bands supported by the wireless device; discontinuous reception cycle lengths supported by the wireless device; or feature group indicator information indicating support for different types of measurement reports. The first and second portions may be first and second RRC segments.

In some embodiments, the control plane connection is an RRC connection, and the radio access capability information is transmitted in one or more RRC messages. The radio access capability information may include information explicitly indicating the radio access capabilities of the wireless device or include a capability identity mapped to the radio access capabilities of the wireless device.

Alternatively or additionally, the wireless device 14 and/or the radio network node 12 in one or more embodiments retroactively check whether the radio access capability information 20 was received by the radio network node 12 with the information's integrity intact. For example, the radio network node 12 may transmit a derivative (e.g., hash) of the received information back to the wireless device 14 so that the device 14 can check the integrity of the information the radio network node 12 received, and perhaps report integrity problems to the network as needed. This and other embodiments for retroactive integrity check may therefore ensure that the network 10 does not store and/or otherwise use radio access capability information 20 that was not received with its integrity intact, while at the same time in some embodiments not imposing a requirement that the information's transmission be delayed until AS security activation.

Figure 4:
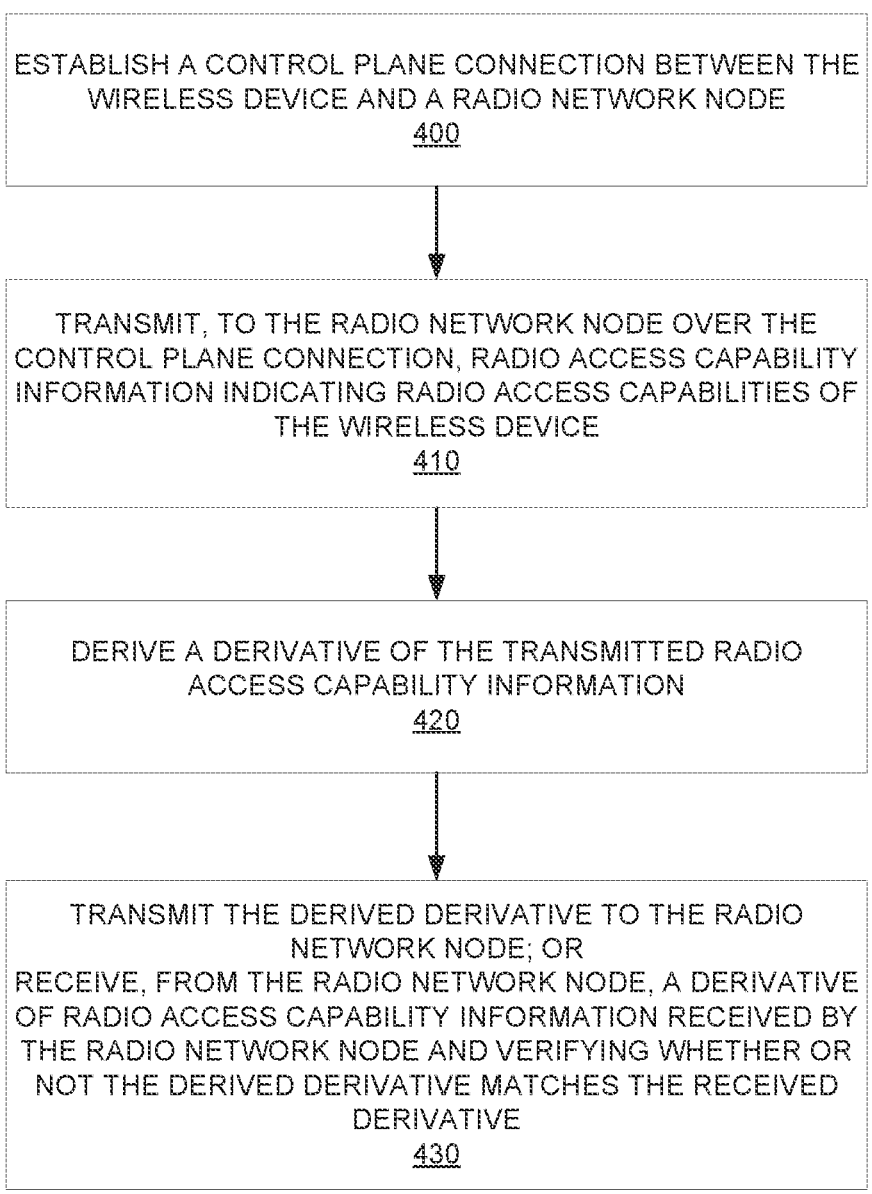
FIG. 4 is a logic flow diagram of a method performed by a wireless device in accordance with other embodiments.

Generally in this regard, FIG. 4 depicts a method performed by a wireless device in accordance with other particular embodiments. The method includes establishing a control plane connection between the wireless device and a radio network node (block 400). The method may further include (e.g., before activating access stratum security for securing the control plane connection) transmitting, to the radio network node over the control plane connection, radio access capability information indicating radio access capabilities of the wireless device (block 410). The method also includes deriving a derivative of the transmitted radio access capability information (block 420). The method further includes (e.g., during or after a procedure that activates access stratum security for securing the control plane connection) transmitting the derived derivative to the radio network node; or receiving, from the radio network node, a derivative of radio access capability information received by the radio network node and verifying whether or not the derived derivative matches the received derivative (block 430).

In some embodiments, the method includes receiving, from the radio network node, the derivative of radio access capability information received by the radio network node and verifying whether or not the derived derivative matches the received derivative. The method may also include transmitting, to the radio network node, a message indicating either completion of the procedure or failure of the procedure, depending respectively on whether or not the derived derivative matches the received derivative according to said verifying. The message may include the radio access capability information.

The method may include transmitting to the radio network node a message indicating whether or not the derived derivative matches the received derivative. The method may also include receiving the received derivative in a Security Mode Command message during the procedure, where the procedure is a Security Mode Command procedure.

In some embodiments, the method includes receiving the received derivative within a message that is integrity protected and/or confidentiality protected.

The method may further include triggering RRC connection re-establishment or non-access stratum recovery responsive to verifying the derived derivative does not match the received derivative.

In other embodiments, the method includes transmitting the derived derivative to the radio network node.

The control plane connection may be an RRC connection and the radio access capability information may be transmitted in one or more RRC messages.

In some embodiments, the radio access capability information includes information explicitly indicating the radio access capabilities of the wireless device or includes a manufacturer-specific capability identity mapped to the radio access capabilities of the wireless device.

In some embodiments, the derived derivative is a hash of the transmitted radio access capability information.

In some embodiments, the method comprises transmitting the derived derivative to the radio network node in or with a security mode complete message.

In some embodiments, the radio access capability information is transmitted before activation of access stratum security over the control plane connection.

In some embodiments, the method transmitting the derived derivative, or receiving the derivative from the radio network node, during or after a procedure for activating access stratum security over the control plane connection. In one such embodiment, the procedure activates access stratum security for securing the control plane connection by activating confidentiality protection and/or integrity protection on the control plane connection.

Figure 5:
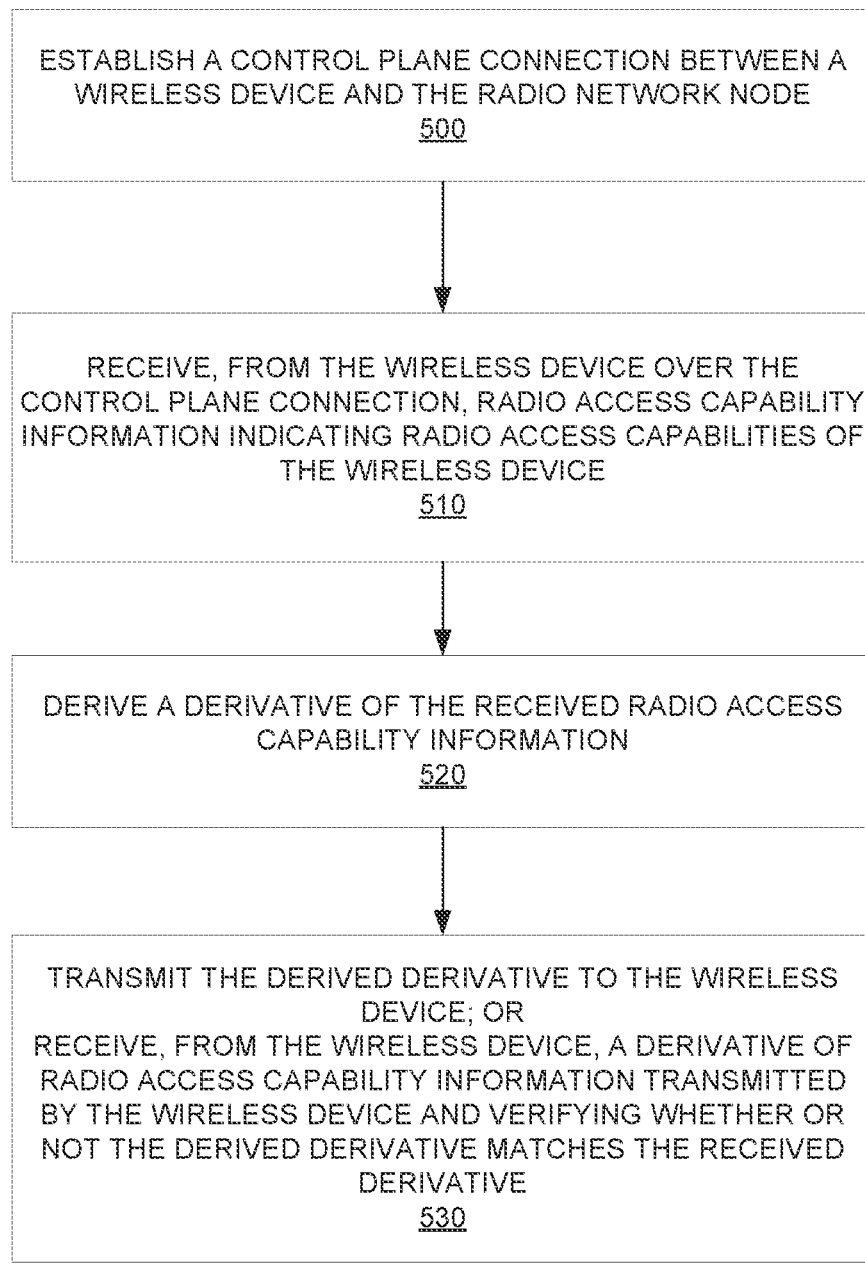
FIG. 5 is a logic flow diagram of a method performed by a network node in accordance with other embodiments.

FIG. 5 depicts a method performed by a radio network node in accordance with other particular embodiments. The method includes establishing a control plane connection between a wireless device and the radio network node (block 500). The method includes (e.g., before activating access stratum security for securing the control plane connection) receiving, from the wireless device over the control plane connection, radio access capability information indicating radio access capabilities of the wireless device (block 510). The method further includes deriving a derivative of the received radio access capability information (block 520). The method then includes (e.g., during or after a procedure that activates access stratum security for securing the control plane connection) transmitting the derived derivative to the wireless device; or receiving, from the wireless device, a derivative of radio access capability information transmitted by the wireless device and verifying whether or not the derived derivative matches the received derivative (block 530).

In some embodiments, the method includes receiving the derivative. The method may also include transmitting, to the wireless device, a message indicating either completion of a procedure or failure of the procedure, depending respectively on whether or not the derived derivative matches the received derivative according to said verifying. The procedure may be a procedure for activating access stratum security over the control plane connection.

The method may include transmitting to the wireless device a message indicating whether or not the derived derivative matches the received derivative.

The method may include receiving the derivative within a message that is integrity protected and/or confidentiality protected.

The method may include triggering RRC connection re-establishment or non-access stratum recovery responsive to verifying the derived derivative does not match the received derivative.

In some embodiments, the method comprises transmitting the derived derivative to the wireless device.

In some embodiments, the method includes transmitting the derived derivative in a Security Mode Command message, e.g., during a Security Mode Command procedure. The method may include transmitted the derived derivative within a message that is integrity protected and/or confidentiality protected.

In some embodiments, the control plane connection is an RRC connection, and the radio access capability information is transmitted in one or more RRC messages. The radio access capability information may include information explicitly indicating the radio access capabilities of the wireless device or comprises a manufacturer-specific capability identity mapped to the radio access capabilities of the wireless device.

In some embodiments, the derived derivative is a hash of the received radio access capability information.

In some embodiments, the radio access capability information is received before activation of access stratum security over the control plane connection.

In some embodiments, the method comprises transmitting the derived derivative, or receiving the derivative from the wireless device, during or after a procedure for activating access stratum security over the control plane connection. In one such embodiment, the procedure activates access stratum security for securing the control plane connection by activating confidentiality protection and/or integrity protection on the control plane connection.

Still other embodiments effectively tag, flag, taint, or otherwise mark radio access capability information as having been received by the wireless communication network before AS security activation, as not having its integrity verified, and/or as being transmitted over-the-air without confidentiality protection. Such a tag, flag, taint, or mark therefore functions as a warning to any node in the network that the information is subject to the potential of tampering and/or leakage. This way, nodes in the network may handle the radio access capability information accordingly.

For example, in some embodiments, the network may permit time-limited storage and/or use of the information if it the information is tagged, tainted, or marked as described above, but may effectively flush the information after the occurrence of certain events and/or time durations, so that the information (in case it was tampered with or leaked) does not propagate and/or have long-term impact. In another example, some network nodes may trigger re-acquisition of the radio access capability information from the device if it was tagged, tainted, or marked.

Figure 6:
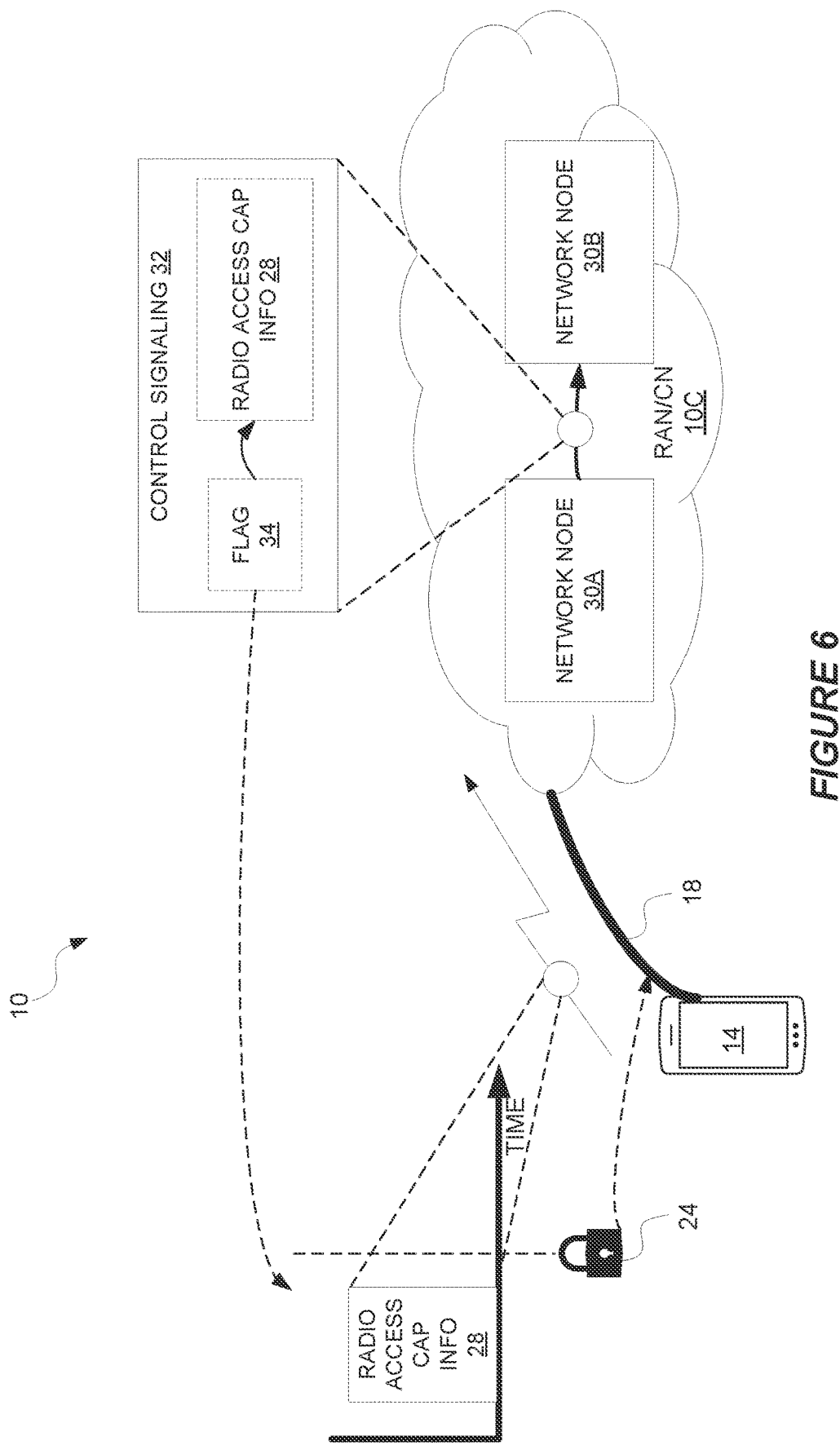
FIG. 6 is a block diagram of a wireless communication network according to other embodiments.

FIG. 6 illustrates some embodiments in this regard. As shown, a wireless device 14 may transmit radio access capability information 28 towards the RAN/CN 10C over a control plane connection 18. The radio access capability information 28 indicates radio access capabilities of the wireless device 14. The radio access capability information 28 may correspond to the radio access capability information 20 described in FIG. 1, but without regard to whether the information 28 is transmitted before or after activation of AS security 24. Alternatively or additionally, the radio access capability information 28 may correspond to the first portion 19 of radio access capability information described in FIG. 1 that is received before activation of AS security 24.

As shown, a network node 30A in the network 10 (e.g., RAN/CN 10C) transmits control signalling 32 to another network node 30B in the network 10. In some embodiments, the control signalling 32 indicates that (or whether) the radio access capability information 28 was received from the wireless device 14 before access stratum security 24 was activated. The control signaling 32 in other embodiments alternatively or additionally indicates that (or whether) the radio access capability information 28 has not had its integrity verified and/or was received from the wireless device 14 without confidentiality protection. In one or more embodiments, the control signaling 32 indicates any of this information with a tag, flag, taint, or other mark associated with the radio access capability information 28. The tag, flag, taint, or other mark may for instance be transmitted with, be included in, or be mapped to the radio access capability information 28. FIG. 6 as an example shows that the control signaling 32 may include both the radio access capability information 28 and a flag 34, e.g., which indicates that (or whether) the radio access capability information 28 was received from the wireless device 14 before access stratum security 24 was activated.

In one or more embodiments where the network nodes 30A and 30B are involved in a handover of the wireless device 14, the control signaling 32 may be included in handover signaling between the network nodes 30A, 30B. For example, where the network nodes 30A, 30B are radio network nodes (e.g., base stations), the control signaling 32 may be included in a handover request from the network node 30A to network node 30B.

In some embodiments, the network node 30B which receives the control signalling 32 may reject, ignore, or re-acquire the radio access capability information 28 if the control signalling 28 indicates the information 28 was received from the wireless device 14 before access stratum security 24 was activated, has not had its integrity verified, and/or was received from the wireless device 14 without confidentiality protection. Alternatively or additionally, the network node 30B may determine how to handle the radio access capability information 28 based on the control signaling 32. For example, this may involve determining whether or not to store, and/or for how long to store, the radio access capability information 28 at the network node 30B. In one such embodiment, for instance, the network node 30B may refrain from storing the radio access capability information 28 at the network node 30B and/or refrain from forwarding the radio access capability information 28 to yet another network node, if the control signaling 32 indicates access stratum security 24 was activated when the radio access capability information 28 was received from the wireless device 14, that the integrity of the radio access capability information 28 has not been verified, and/or that the radio access capability information 28 was received without confidentiality protection. These and other embodiments may thereby limit the propagation and/or long-term impact of the radio access capability information 28 under these circumstances.

Figure 7:
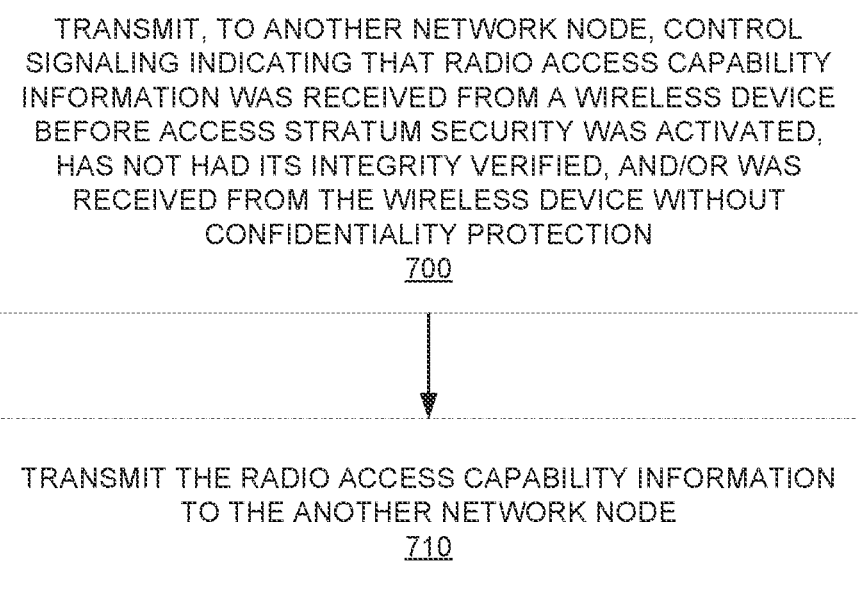
FIG. 7 is a logic flow diagram of a method performed by a network node in accordance with still other embodiments.

In view of the variations and modifications above, FIG. 7 depicts a method performed by network node 30A in accordance with other particular embodiments. The method includes transmitting, to network node 30B, control signaling 32 indicating that (or whether) radio access capability information 28 was received from a wireless device 14 before access stratum security 24 was activated, has not had its integrity verified, and/or was received from the wireless device 14 without confidentiality protection (block 700).

The method may include transmitting the radio access capability information 28 to network node 30B (Block 710), and the control signalling 32 may be transmitted in association with the radio access capability information 28.

In some embodiments, the control signalling 32 is included in a handover request to network node 30B, where the network nodes 30A, 30B are each a radio network node. In other embodiments, network node 30A may be a radio network node and network node 30B may be a core network node. The core network node may be an MME or may implement an AMF.

In some embodiments, the method may further comprise: (i) before transmitting the control signaling, determining that access stratum security was not activated when radio access capability information was received from the wireless device; (ii) responsive to said determining, requesting the radio access capability information from the wireless device after activation of access stratum security; and (iii) generating the control signaling to indicate that access stratum security was activated when the radio access capability information was received from the wireless device.

In some embodiments, the radio access capability information comprises information explicitly indicating the radio access capabilities of the wireless device or comprises a capability identity mapped to the radio access capabilities of the wireless device.

In other embodiments, the network node 30A is a core network node and the another network node 30B is a core network node.

FIG. 8 depicts a corresponding method performed by the network node 30B in accordance with other particular embodiments. The method includes receiving, from network node 30A, control signaling 32 indicating that (or whether) radio access capability information 28 was received from a wireless device 14 before access stratum security 24 was activated, has not had its integrity verified, and/or was received from the wireless device 14 without confidentiality protection (block 800).

The method may also include receiving the radio access capability information 28 from network node 30A (Block 20), and the control signaling 32 may be received in association with the radio access capability information 28.

In some embodiments, the control signalling 32 is included in a handover request from network node 30A, e.g., where the network nodes 30A, 30B are each a radio network node.

In some embodiments, the method may further include requesting radio access capability information 28 from the wireless device 14 after activation of access stratum security 24, or accepting radio access capability information 28 received from network node 30A, depending on the control signalling 32 (Block 820).

The network node 30A may be a core network node and network node 30B may be a radio network node. The core network node may be an MME or implement an AMF.

The method in some embodiments may include receiving the radio access capability information 28 from network node 30A and determining how to handle the received radio access capability information 28 based on the control signalling 32. The determining may include determining whether or not to store the received radio access capability information at the network node 30B. The method may alternatively or additionally further include storing or refraining from storing the received radio access capability information 28 at the network node 30B, depending on whether or not access stratum security 24 was activated when the radio access capability information 28 was received from the wireless device 14, whether or not the integrity of the radio access capability information has been verified, and/or whether or not the radio access capability information was received without confidentiality protection, (Block 830). The determining may alternatively or additionally include determining whether or not to forward the received radio access capability information 28 to yet another network node. The method may alternatively or additionally include forwarding or refraining from forwarding the received radio access capability information 28, depending on whether or not access stratum security 24 was activated when the radio access capability information 28 was received from the wireless device 14, whether or not the integrity of the radio access capability information has been verified, and/or whether or not the radio access capability information was received without confidentiality protection.

In some embodiments, the control signaling and/or the received radio access capability information includes an identifier of a node or cell which retrieved the radio access capability information from the wireless device or another node. The radio access capability information may include information explicitly indicating the radio access capabilities of the wireless device or include a capability identity mapped to the radio access capabilities of the wireless device.

In some embodiments, the network node 30B is a core network node and the another network node 30A is a core network node.

In yet other embodiments herein, the control signalling 32 may alternatively or additionally indicate one or more restrictions or limitations on storage, use, and/or propagation of the radio access capability information 28. For example, the control signalling 32 may indicate a limited window of time during which the radio access capability information 28 may be stored, used, and/or propagated. Alternatively or additionally, the control signalling 32 may indicate limited way(s) and/or purpose(s) for which the radio access capability information 28 may be used. These and other embodiments may similarly limit the propagation and/or long-term impact of the radio access capability information 28.

Figure 9:
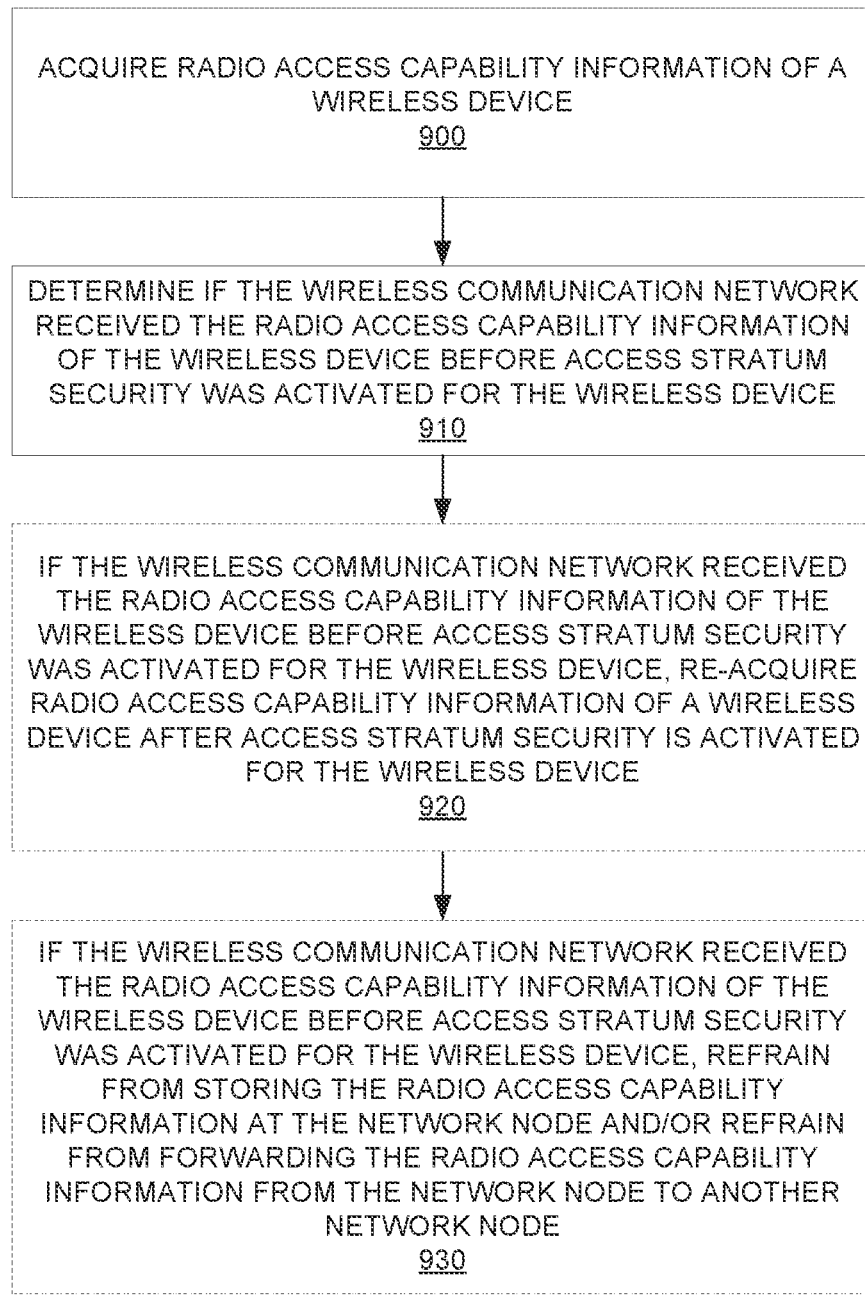
FIG. 9 is a logic flow diagram of a method performed by a network node in accordance with other embodiments.

FIG. 9 depicts a method performed by a network node in a wireless communication network 10 in accordance with other particular embodiments. The method includes acquiring radio access capability information 28 of a wireless device 14 (Block 900). The radio access capability information 28 of the wireless device 14 indicates radio access capabilities of the wireless device 14. The method also includes determining if the wireless communication network 10 received the radio access capability information 28 of the wireless device 14 before access stratum security 24 was activated for the wireless device 14 (Block 910).

The method in some embodiments further includes, if the wireless communication network 10 received the radio access capability information 28 of the wireless device 14 before access stratum security 24 was activated for the wireless device 14 according to said determining, re-acquiring the radio access capability information 28 of the wireless device 14 after access stratum security 24 is activated for the wireless device 14 (Block 920). Alternatively or additionally, the method may include, if the wireless communication network 10 received the radio access capability information 28 of the wireless device 14 before access stratum security 24 was activated for the wireless device 14 according to said determining, refraining from storing the radio access capability information 28 at the network node and/or refraining from forwarding the radio access capability information 28 from the network node to another network node (Block 930).

Embodiments herein also include corresponding apparatuses. Embodiments herein for instance include a wireless device configured to perform any of the steps of any of the embodiments described above for the wireless device.

Embodiments also include a wireless device comprising processing circuitry and power supply circuitry. The processing circuitry is configured to perform any of the steps of any of the embodiments described above for the wireless device. The power supply circuitry is configured to supply power to the wireless device.

Embodiments further include a wireless device comprising processing circuitry. The processing circuitry is configured to perform any of the steps of any of the embodiments described above for the wireless device. In some embodiments, the wireless device further comprises communication circuitry.

Embodiments further include a wireless device comprising processing circuitry and memory. The memory contains instructions executable by the processing circuitry whereby the wireless device is configured to perform any of the steps of any of the embodiments described above for the wireless device.

Embodiments moreover include a user equipment (UE). The UE comprises an antenna configured to send and receive wireless signals. The UE also comprises radio front-end circuitry connected to the antenna and to processing circuitry, and configured to condition signals communicated between the antenna and the processing circuitry. The processing circuitry is configured to perform any of the steps of any of the embodiments described above for the wireless device. In some embodiments, the UE also comprises an input interface connected to the processing circuitry and configured to allow input of information into the UE to be processed by the processing circuitry. The UE may comprise an output interface connected to the processing circuitry and configured to output information from the UE that has been processed by the processing circuitry. The UE may also comprise a battery connected to the processing circuitry and configured to supply power to the UE.

Embodiments herein also include a network node configured to perform any of the steps of any of the embodiments described above for the network node.

Embodiments also include a network node comprising processing circuitry and power supply circuitry. The processing circuitry is configured to perform any of the steps of any of the embodiments described above for the network node. The power supply circuitry is configured to supply power to the network node.

Embodiments further include a network node comprising processing circuitry. The processing circuitry is configured to perform any of the steps of any of the embodiments described above for the network node. In some embodiments, the network node further comprises communication circuitry.

Embodiments further include a network node comprising processing circuitry and memory. The memory contains instructions executable by the processing circuitry whereby the network node is configured to perform any of the steps of any of the embodiments described above for the network node.

More particularly, the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 10:
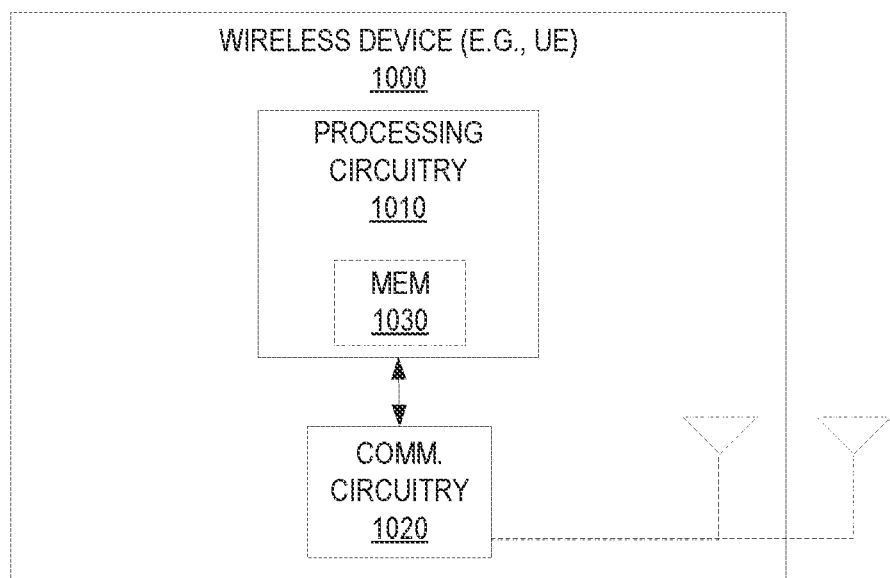
FIG. 10 is a block diagram of a wireless device in accordance with particular embodiments.

FIG. 10 for example illustrates a wireless device 1000 as implemented in accordance with one or more embodiments. As shown, the wireless device 1000 includes processing circuitry 1010 and communication circuitry 1020. The communication circuitry 1020 (e.g., radio circuitry) is configured to transmit and/or receive information to and/or from one or more other nodes, e.g., via any communication technology. Such communication may occur via one or more antennas that are either internal or external to the wireless device 1000. The processing circuitry 1010 is configured to perform processing described above, such as by executing instructions stored in memory 1030. The processing circuitry 1010 in this regard may also implement certain functional means, units, or modules.

Figure 11:
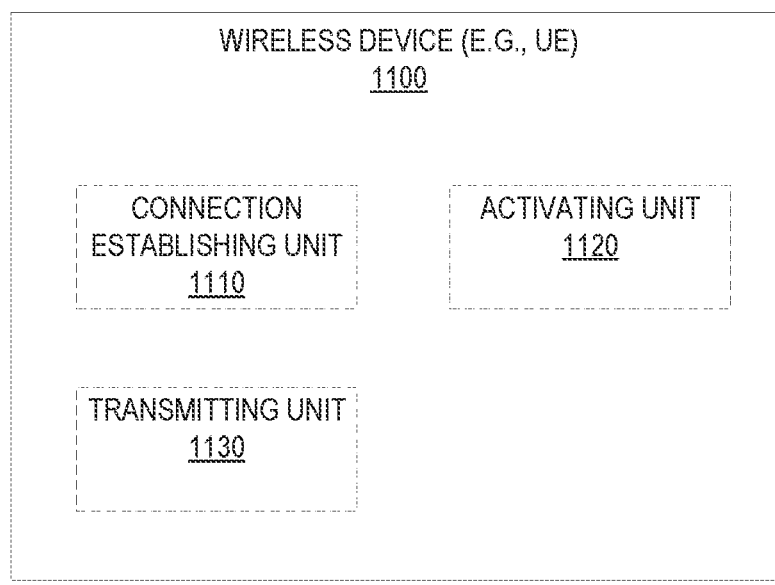
FIG. 11 is a block diagram of a wireless device in accordance with other embodiments.
Figure 25:
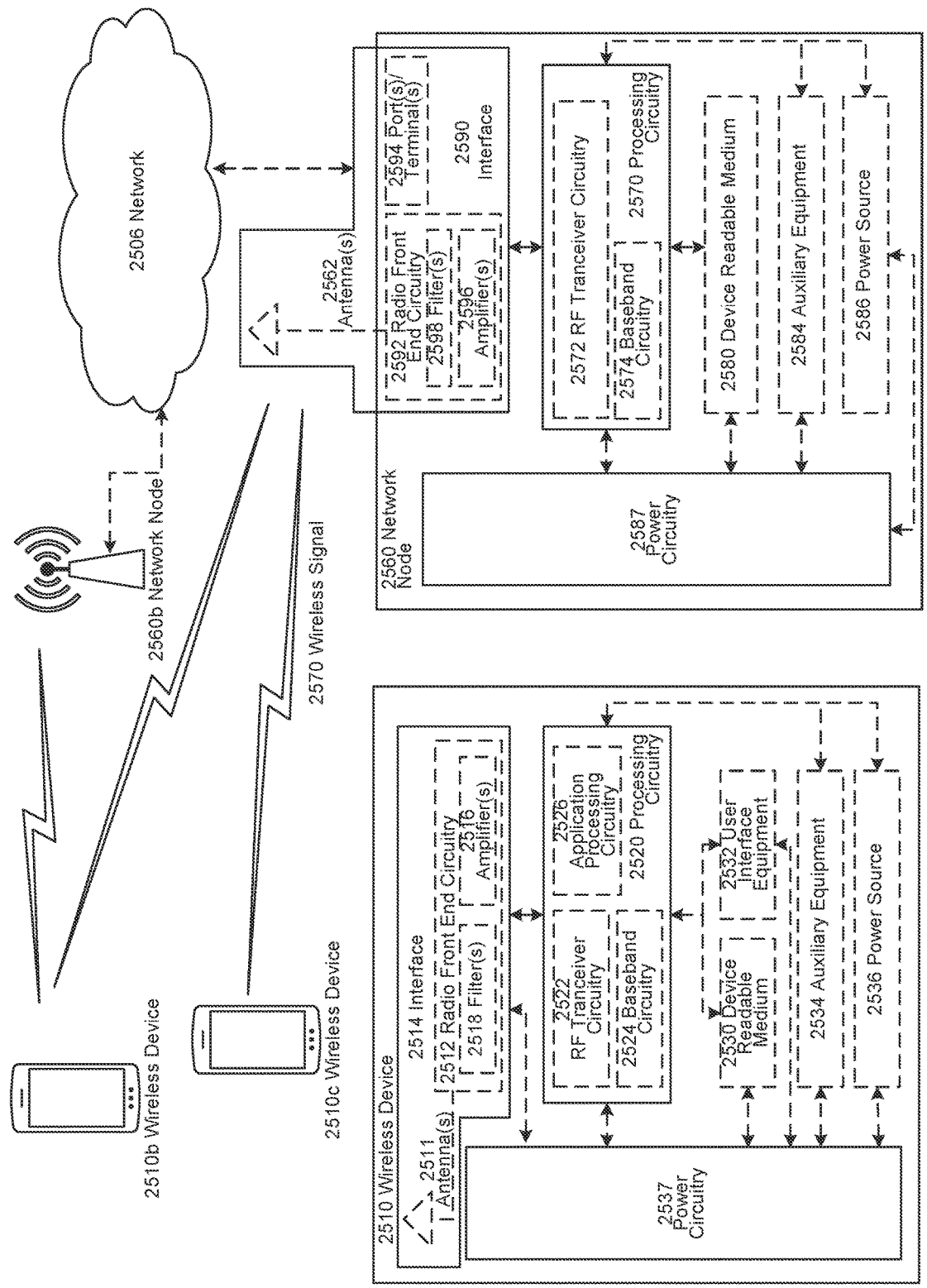
FIG. 25 is a block diagram of a wireless communication network according to some embodiments.

FIG. 11 illustrates a schematic block diagram of a wireless device 1100 in a wireless network according to still other embodiments (for example, the wireless network shown in FIG. 25). As shown, the wireless device 1100 implements various functional means, units, or modules, e.g., via the processing circuitry 1010 in FIG. 10 and/or via software code. These functional means, units, or modules, e.g., for implementing the method(s) herein, include for instance: connection establishing unit 1110 configured to establish a control plane connection between the wireless device and a radio network node and an activating unit 1120 configured to activate access stratum security for securing the control plane connection. The wireless device 1100 also includes a transmitting unit 1130 configured to, after activating access stratum security, transmit, to the radio network node over the control plane connection, radio access capability information indicating radio access capabilities of the wireless device.

Figure 12:
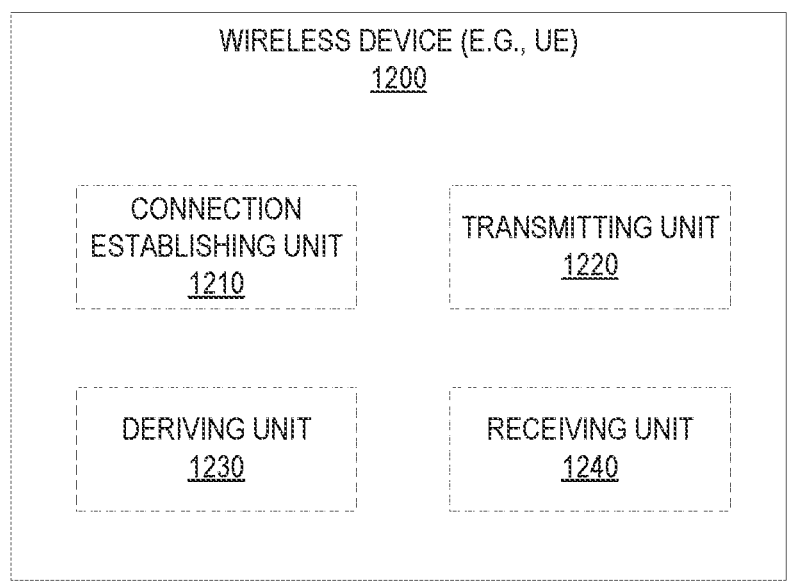
FIG. 12 is a block diagram of a wireless device in accordance with still other embodiments.

FIG. 12 illustrates another functional implementation of a wireless device 1200, according to some embodiments, and includes a connection establishing unit 1210 configured to establish a control plane connection between the wireless device and a radio network node. The wireless device 1200 also includes a transmitting unit 1220 configured to, before activating access stratum security for securing the control plane connection, transmit, to the radio network node over the control plane connection, radio access capability information indicating radio access capabilities of the wireless device. The wireless device 1200 also includes a deriving unit 1230 configured to derive a derivative of the transmitted radio access capability information. The transmitting unit 1220 is also configured to, during or after a procedure that activates access stratum security for securing the control plane connection, transmit the derived derivative to the radio network node. The wireless device 1200 also includes a receiving unit 1240 configured to, during or after the procedure that activates access stratum security for securing the control plane connection, receive, from the radio network node, a derivative of radio access capability information received by the radio network node and verify whether or not the derived derivative matches the received derivative.

Figure 13:
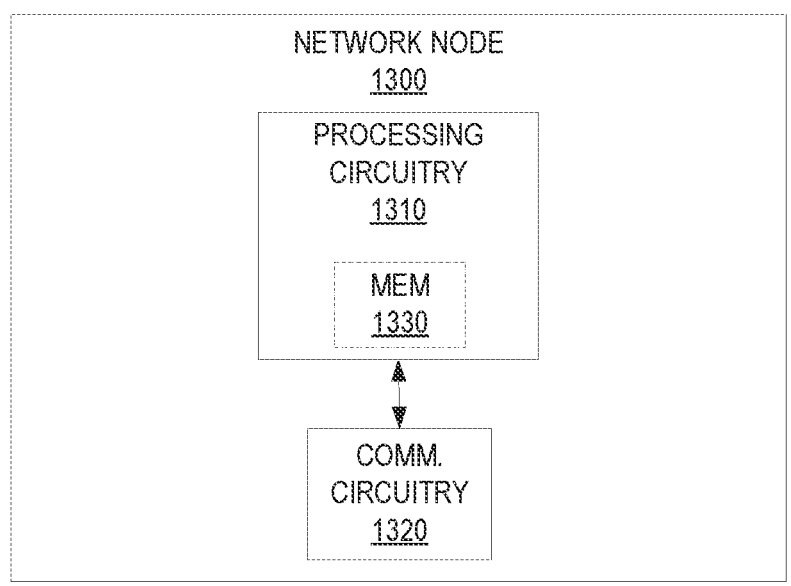
FIG. 13 is a block diagram of a network node in accordance with particular embodiments.

FIG. 13 illustrates a network node 1300, such as a radio network node or core network node, as implemented in accordance with one or more embodiments. As shown, the network node 1300 includes processing circuitry 1310 and communication circuitry 1320. The communication circuitry 1320 is configured to transmit and/or receive information to and/or from one or more other nodes, e.g., via any communication technology. The processing circuitry 1310 is configured to perform processing described above, such as by executing instructions stored in memory 1330. The processing circuitry 1310 in this regard may implement certain functional means, units, or modules.

Figure 14:
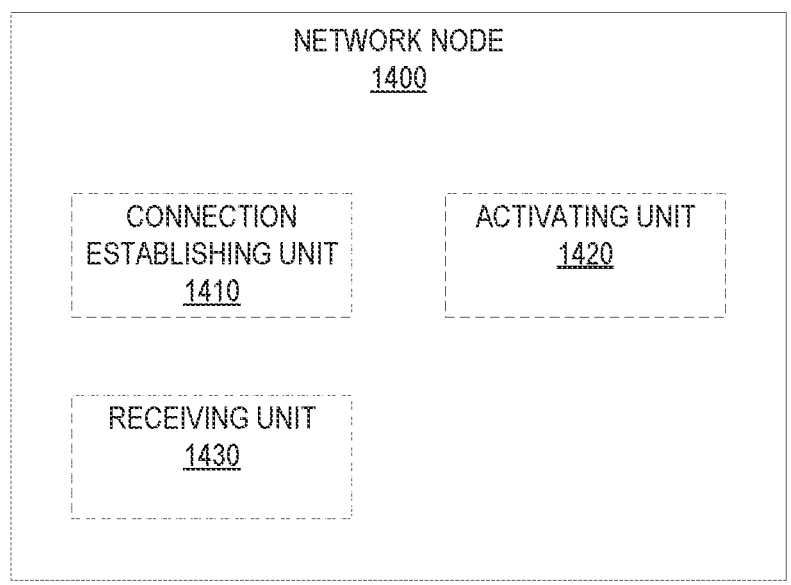
FIG. 14 is a block diagram of a network node in accordance with other embodiments.

FIG. 14 illustrates a schematic block diagram of a radio network node 1400 in a wireless network according to still other embodiments. As shown, the network node 1400 implements various functional means, units, or modules, e.g., via the processing circuitry 1310 in FIG. 13 and/or via software code. These functional means, units, or modules, e.g., for implementing the method(s) herein, include for instance: connection establishing unit 1410 configured to establish a control plane connection between a wireless device and the radio network node and an activating unit 1420 configured to activate access stratum security for securing the control plane connection. The wireless device 1400 also includes a receiving unit 1430 configured to, after activating access stratum security, receive, from the wireless device over the control plane connection, radio access capability information indicating radio access capabilities of the wireless device.

Figure 15:
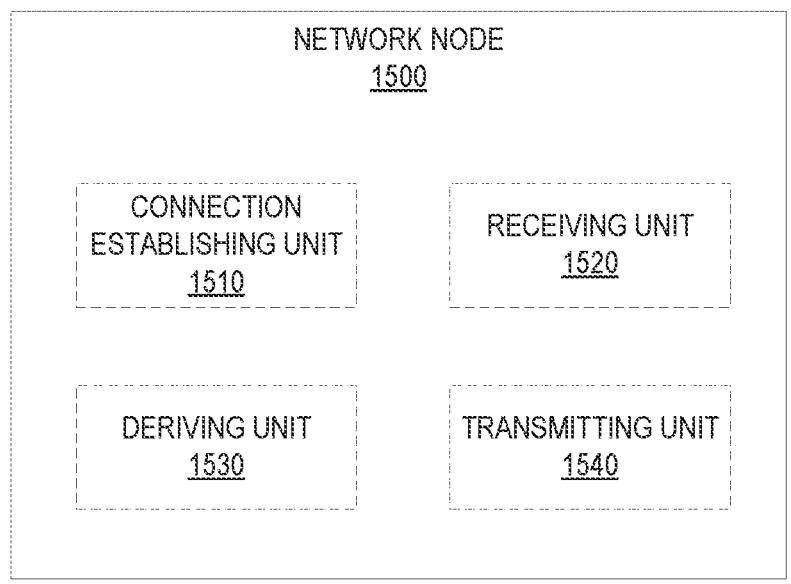
FIG. 15 is a block diagram of a network node in accordance with yet other embodiments.

FIG. 15 illustrates another functional implementation of a radio network node 1500, according to some embodiments, and includes a connection establishing unit 1510 configured to establish a control plane connection between a wireless device and the radio network node. The radio network node 1500 also includes a receiving unit 1520 configured to, before activating access stratum security for securing the control plane connection, receive, from the wireless device over the control plane connection, radio access capability information indicating radio access capabilities of the wireless device. The radio network node 1500 also includes a deriving unit 1530 configured to derive a derivative of the received radio access capability information. The receiving unit 1520 is also configured to, during or after a procedure that activates access stratum security for securing the control plane connection, receive, from the wireless device, a derivative of radio access capability information transmitted by the wireless device and verifying whether or not the derived derivative matches the received derivative. The radio network node 1500 also includes a transmitting unit 1540 configured to, during or after the procedure that activates access stratum security for securing the control plane connection, transmit the derived derivative to the wireless device.

Figure 16:
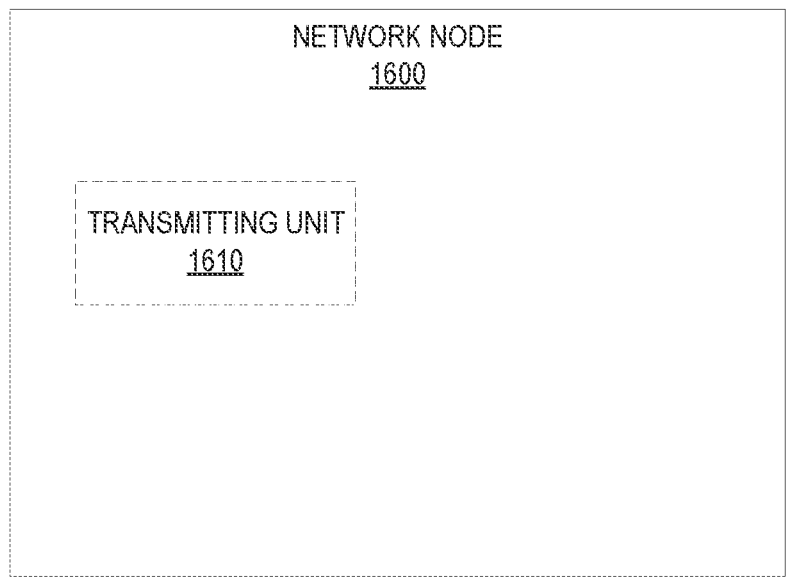
FIG. 16 is a block diagram of a network node in accordance with still other embodiments.

FIG. 16 illustrates another functional implementation of a network node 1600, according to some embodiments, and includes a transmitting unit 1610 configured to transmit, to another network node, control signaling indicating whether or not access stratum security was activated when radio access capability information indicating radio access capabilities of a wireless device was received from the wireless device.

Figure 17:
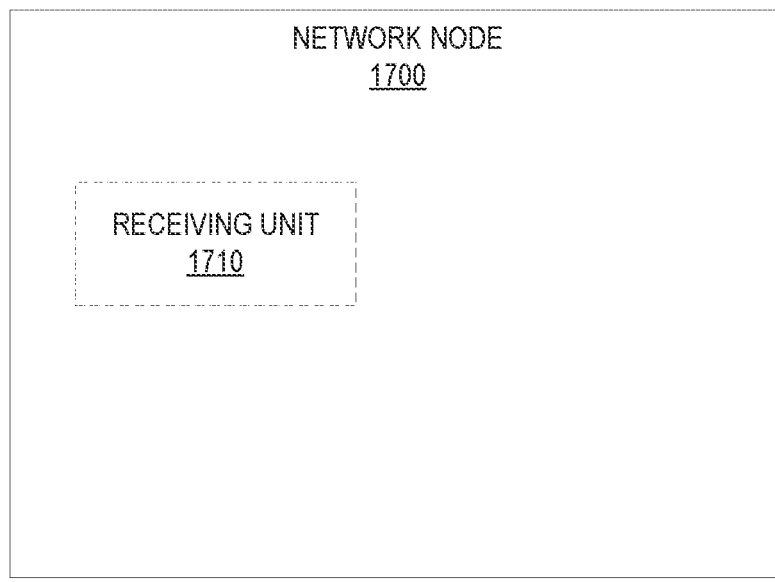
FIG. 17 is a block diagram of a network node in accordance with other embodiments.

FIG. 17 illustrates another functional implementation of a network node 1700, according to some embodiments, and includes a receiving unit 1710 configured to receive, from another network node, control signaling indicating whether or not access stratum security was activated when radio access capability information indicating radio access capabilities of a wireless device was received from the wireless device.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described. In one or more of the below embodiments, a UE is discussed as an example of the wireless device 14 in FIG. 1, the network (generally) or the gNB (specifically) is discussed as an example of the radio network node 12 in FIG. 1, and AS capabilities or UE capabilities is discussed as an example of radio access capabilities indicated by the radio access capability information 20 in FIG. 1.

Figure 18:
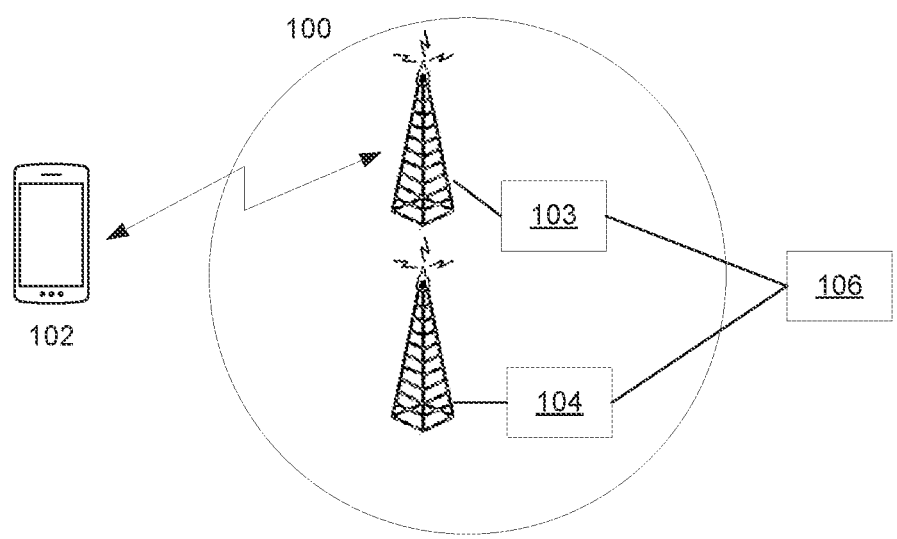
FIG. 18 is a block diagram of a wireless communication system according to some embodiments.

FIG. 18 illustrates a simplified wireless communication system with a UE 102 that communicates with one or multiple access nodes 103-104, which in turn is connected to a network node 106. The access nodes 103-104 are part of the radio access network 100.

For wireless communication systems pursuant to 3GPP Evolved Packet System, EPS (also referred to as Long Term Evolution, LTE, or 4G) standard specifications, such as specified in 3GPP TS 36.300 and related specifications, the access nodes 103-104 corresponds typically to an Evolved NodeB (eNB) and the network node 106 corresponds typically to either a Mobility Management Entity (MME) and/or a Serving Gateway (SGW). The eNB is part of the radio access network 100, which in this case is the E-UTRAN (Evolved Universal Terrestrial Radio Access Network), while the MME and SGW are both part of the EPC (Evolved Packet Core network). The eNBs are inter-connected via the X2 interface, and connected to EPC via the S1 interface, more specifically via S1-C to the MME and S1-U to the SGW.

For wireless communication systems pursuant to 3GPP 5G System, 5GS (also referred to as New Radio, NR, or 5G) standard specifications, such as specified in 3GPP TS 38.300 and related specifications, the access nodes 103-104 correspond typically to an 5G NodeB (gNB) and the network node 106 corresponds typically to either a Access and Mobility Management Function (AMF) and/or a User Plane Function (UPF). The gNB is part of the radio access network 100, which in this case is the NG-RAN (Next Generation Radio Access Network), while the AMF and UPF are both part of the 5G Core Network (5GC). The gNBs are inter-connected via the Xn interface, and connected to 5GC via the NG interface, more specifically via NG-C to the AMF and NG-U to the UPF.

To support fast mobility between NR and LTE and to avoid a change of core network, LTE eNBs can also be connected to the 5G-CN via NG-U/NG-C and support the Xn interface. An eNB connected to 5GC is called a next generation eNB (ng-eNB) and is considered part of the NG-RAN.

To allow a wide range of UE implementations, different UE capabilities are specified in LTE and NR. The UE capabilities are sent by the UE to the network when a connection is established and is used by the network to select a configuration that is supported by the UE.

In general, the UE capabilities can be classified into two categories depending on which layer of the protocol hierarchy the given capability is related to. The access stratum (AS) level capabilities are access technology dependent parts of the capability information, such as UE power class and supported frequency bands. The AS capabilities are used by the radio access network (i.e., the eNB/gNB). The non-access stratum (NAS) level capabilities are the capabilities which are not access related such as supported security algorithms. The NAS capabilities are used by the core network (i.e., EPC or 5GC). Without loss of generality and for convenience, only the AS capabilities will be discussed. Furthermore, unless specified otherwise, the term UE capabilities refers to the AS capabilities. The AS capabilities (also referred to as UE capabilities) below will be discussed below as an example pf the radio access capabilities indicated by the radio access capability information 20 in FIG. 1.

The UE capabilities are transferred using RRC signaling from the UE to the radio access node. In order to avoid requiring UEs to send the AS capabilities over the radio interface each time the UE transitions to connected mode (i.e., when the UE specific context is created in the radio access network), the radio access node stores the AS capabilities in the core network (i.e., MME/AMF) while the UE is in idle mode. At subsequent transitions to connected mode, the access node can retrieve the AS capabilities from the core network instead of requesting them again from the UE.

Figure 19:
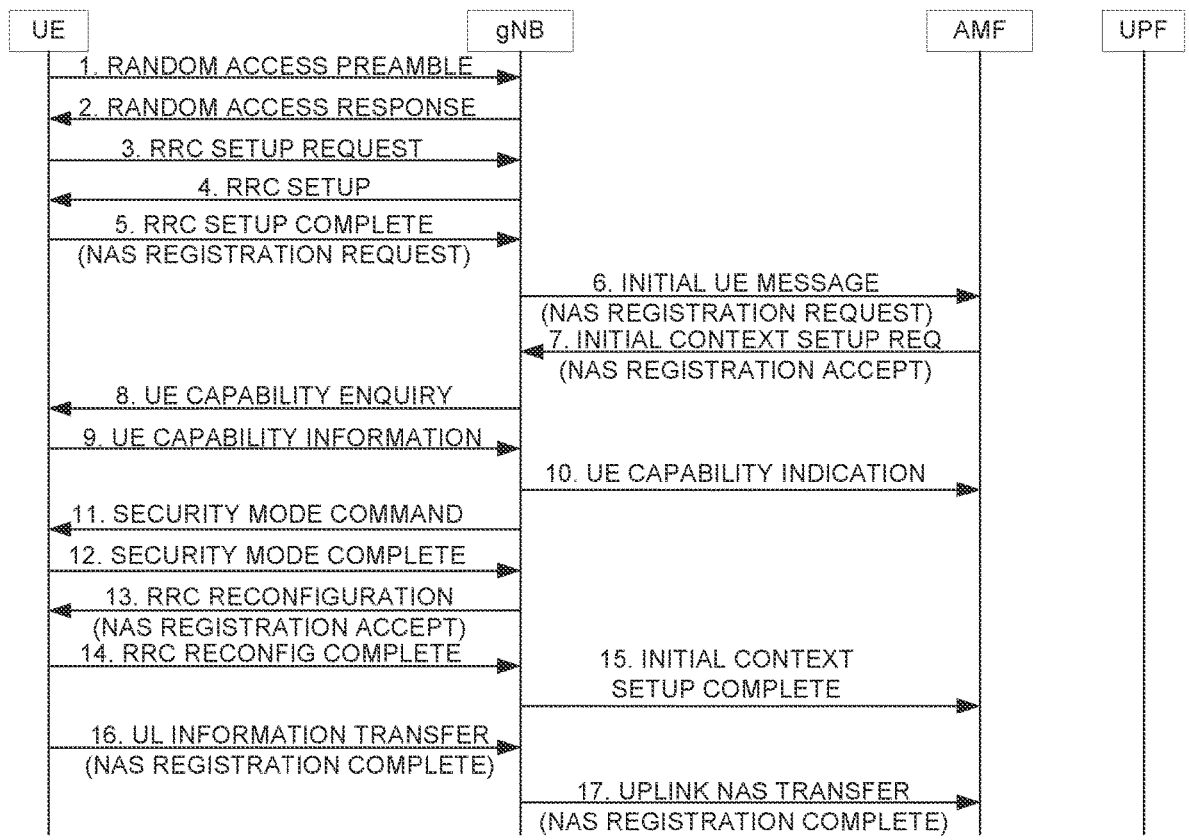
FIG. 19 is a signaling diagram for retrieving UE capabilities at initial network attach.

The AS capabilities are typically retrieved from the UE when the UE attaches to the network for the first time. Since the core network does not have any valid UE capability information stored in this case, no UE capabilities will be provided to the radio access node by the core network when the initial UE context is established after the RRC connection setup. This will cause the radio access node to retrieve the UE capabilities from the UE using the UE capability transfer procedure and upload them to the core network. The initial attach and the capability retrieval is illustrated in FIG. 19 for the case of NR. FIG. 19 shows that UE capabilities are retrieved by the RAN and stored in the CN at initial network attach.

Figure 21:
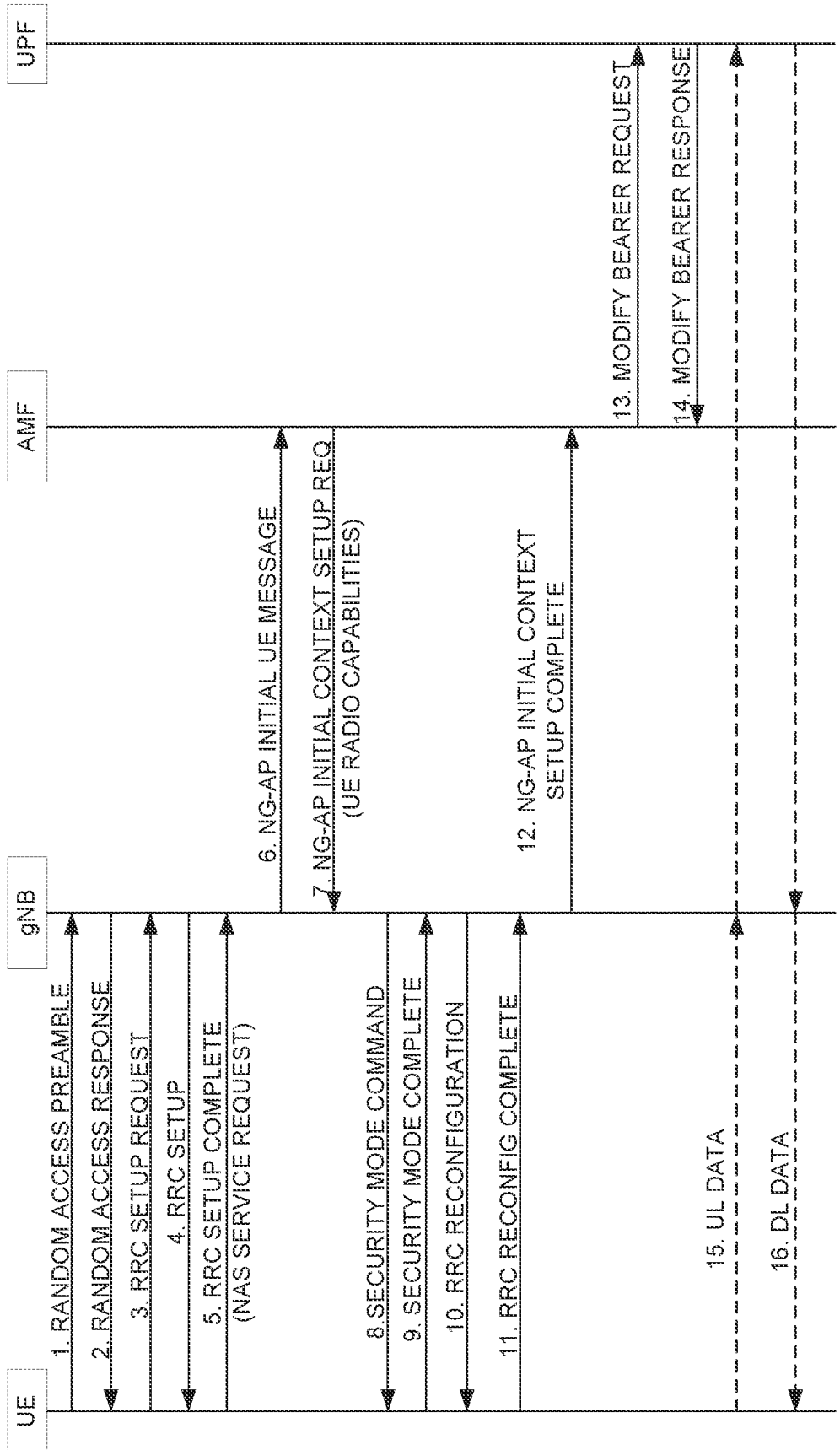
FIG. 21 is a signaling diagram for retrieving UE capabilities at connection setup.

The next time the UE connects to the network, such as for a service request, the UE capabilities are stored in the core network and will be provided to the radio access node as part of the initial UE context establishment. This is illustrated in FIG. 21 for the case of NR. FIG. 21 shows that UE capabilities are stored in the CN and retrieved by the RAN at connection setup.

In both LTE and NR, the network can request the UE to provide its capabilities for specific RAT(s) in the UE capability enquiry message. When responding, the UE include its capabilities for each of the indicated RATs in a RAT specific capability container in the UE capability information message. For NR, the network can further request the UE to provide NR capabilities only for a restricted set of band combinations to reduce the size of the capability information that needs to be transferred.

At connected mode mobility (i.e., handover), the UE capabilities are transferred to the target access node from either the source access node or the source core network, depending on the type of handover. For intra-RAT handover (i.e., NR to NR or LTE to LTE) the UE capabilities are directly transferred from the source access node to target access node in the inter-node messages exchanged between the source and target access node. For inter-RAT handover (i.e., LTE to NR or NR to LTE), the UE capabilities are transferred from the source core network to the target core network, which in turn forwards them to the target access node.

Traditionally, UE capabilities have been considered static information, which in principle means they can be retrieved once and then stored in the core network for future use. However, in recent years there has been a demand from UE vendors to be able to dynamically change the UE capabilities depending on the scenario and environment the UE is in. Therefore, in NR and later releases of LTE, the UE can indicate to the core network that it has updated its UE capabilities in the tracking area update procedure, which will cause the core network to trigger a new retrieval of the UE capabilities.

There is ongoing study in 3GPP named Radio Capabilities Signalling Optimisations (RACS), see TR 23.743, where multiple solutions are considered to transfer the UE capabilities from the UE to the network in an efficient manner. The mechanisms discussed in the study include segmentation of UE capabilities, compression of UE capabilities and assigning a short ID to UE capabilities, referred to as the UE capability ID. The motivation for studying these enhancements is that the UE capabilities tend to become very large in NR due to the many band combinations and radio parameters. In some cases, the band is even larger than 65 kB.

Today the UE capabilities can be retrieved before AS security activation, which means that they are sent without confidentiality and integrity protection over the air interface. When retrieved before AS security activation, the lack of integrity protection means an attacker can manipulate the UE capabilities and thereby adversely affect the communication between UE and network. This attack is made worse by the fact that the manipulated UE capabilities are stored in the network and could potentially be used for a long time (i.e., the attack is a so called persistent attack).

Furthermore, when retrieved before AS security activation, the lack of confidentiality protection implies a privacy risk since an attacker can potentially use the UE capabilities to identify and track the UE.

The solutions discussed in the Rel-16 study item on Radio Capabilities Signalling Optimisations (RACS), including segmentation, compression and ID mapping for UE capabilities, suffer from similar threats to UE privacy and network manipulation. In the case of compression of UE capabilities, the compressed UE capabilities could be changed by a man in the middle attack. In the case of segmentation of UE capabilities, the individual segments could be changed by a man in the middle attack. In the case of UE capability ID solutions, the UE capability ID could be modified, or the UE capability ID mapping in the RAN and core network could be manipulated by indicating wrong capabilities for a specific UE Capability ID.

Certain aspects of the present disclosure and their embodiments may provide solutions to these or other challenges. To ensure the integrity of the UE capabilities the following solutions can be considered:

a) Only allow the UE capabilities to be retrieved after AS security activation;
b) UE capabilities can be retrieved from UE before AS security activation, but derivation (like a hash) is sent securely afterwards to UE or network so that UE or network can verify the integrity of the previously retrieved UE capabilities;
c) Only a minimum part of the UE capabilities can be retrieved before AS security activation (e.g., the capabilities required to start early measurement reporting); and
d) The UE capabilities can be retrieved before AS security activation but are then tagged so that the subsequent receiver is aware of this fact and can decide whether to re-request the UE capabilities.

Solutions (a) and (c) are also beneficial from a user privacy point of view, since no or only a minimum of UE capability information is revealed over the air interface in these solutions.

It should be noted that most of the solutions/features described below for LTE and NR in this document also apply to LTE connected to 5GC. When the term LTE is later used without further specification, it refers to LTE-EPC. The teachings described herein may apply to both AS and NAS capabilities, and to radio and security capabilities. The teachings are not meant to limit the applicability only to EPS or 5GS. The teachings may also apply when the UE capabilities are compressed, segmented or represented by a network/UE assigned capability ID.

Some embodiments herein enable the system to detect if UE capabilities were tampered with when transmitted between the UE and the network. The embodiments may also minimize privacy exposure due to UE capabilities exposed when transmitted between the UE and the network. The embodiments provide the advantage of preventing an attacker from manipulating the UE capabilities transmitted over-the-air and thereby causing damage to the network or UE, e.g., service degradation. The embodiments alternatively or additionally provide the advantage of mitigating privacy risk mentioned earlier.

Figure 20:
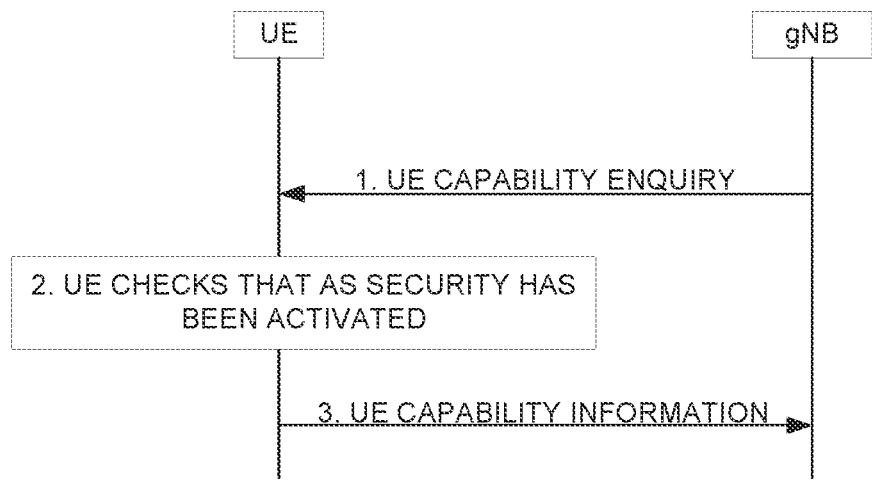
FIG. 20 is a signaling diagram for sending UE capabilities after access stratum (AS) security activation according to some embodiments.

More particularly, in one embodiment, the UE (e.g., as an example of wireless device 14 in FIG. 1) checks that AS security (e.g., AS security 24) has been activated before it transmits its capabilities to the network (e.g., as represented by radio network node 12 in FIG. 1). This is illustrated in the signaling diagram in FIG. 20 for the case of NR. FIG. 20 illustrates the sending of UE capabilities after AS security activation. At Step 1, the networks sends the UE capability enquiry message to the UE. Upon receiving the UE capability enquiry message, the UE checks that AS security has been activated (Step 2). If AS security has not been activated, the UE may ignore the message, send a UE capability reject, or trigger some error recovery mechanism like NAS recovery. Provided the check in the previous step is successful, the UE responds with the UE capability information message, including the UE capabilities (Step 3).

Another variant of the above solution is to allow the UE capability enquiry message to be sent before AS security activation, but not the UE capability information message that contains the UE capabilities. It means that even if the UE gets UE capability enquiry before security activation, the UE waits until AS security activation has been successful. Only after the successful AS security activation does the UE respond with the UE capability information message. This also covers scenarios when the UE capabilities are segmented, compressed or represented by a network/UE assigned capability ID.

Yet another variant of the above solution is that the network waits to send the UE capability enquiry message to the UE until AS security has been enabled.

In some embodiments, a hash is used as an example of a derivative of UE capabilities. It is meant to be example and not be limiting. Other examples of derivatives are a size of UE capabilities, a keyed-hash, a message authentication code generated using cryptographic integrity protection algorithm, a digital signature using public/private key cryptography, or any other method that allows both the UE and the network to derive the same derivative.

Figure 22:
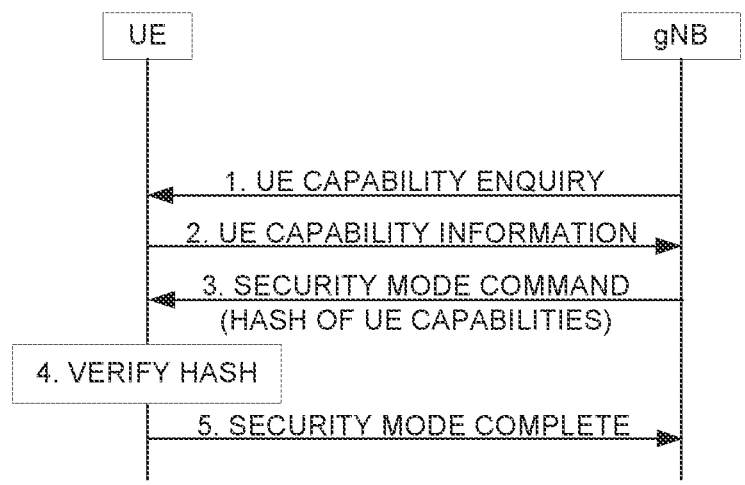
FIG. 22 is a signaling diagram for using a hash of UE capabilities sent after access stratum (AS) security activation according to some embodiments.

In an embodiment, the UE capabilities can be sent by the UE to the network before AS security activation, but a derivative (e.g., hash) is sent by the network to the UE after AS security activation so that the UE can verify the integrity of the UE capabilities received by the network. An example of this solution is illustrated in FIG. 22 for the case of NR. FIG. 22 illustrates a solution that uses a hash of UE capabilities sent after AS security activation. In this example solution, the network sends the UE capability enquiry message to the UE (Step 1). The UE responds with UE capability information message containing the UE capabilities (Step 2). Upon activating AS security, the network includes a hash of the UE capabilities received in the previous step in the security mode command (Step 3). Note that the security mode command is sent integrity protected. The UE verifies that the hash of the UE capabilities sent in Step 2 matches the hash received from the network (Step 4). If the verification fails, the UE may trigger some appropriate error recovery mechanism like security mode failure, or RRC re-establishment or NAS recovery. The UE may also send a security mode complete and include UE capabilities again. Note that the security mode complete message is security protected. Provided the check in the previous step is successful, the UE responds with the security mode complete message that indicates to the network that the verification of the hash was successful (Step 5).

Note that in the above example the hash is sent in the security mode command message, but in in principle, any downlink message sent after AS security activation could be used.

It is also possible to reverse the roles of the UE and the network, i.e., the UE can send the hash to the network after AS security activation and then the network does the verification. If the hash is sent from the UE to network using a new procedure (i.e. the security mode command procedure is not re-used) then a new response message from the network to the UE may indicate the result of the verification. If the hash is sent by the UE to the network in the security mode complete message the following may apply. If the verification fails, the network may try to release the UE by sending an RRC release message. Another option is that the network simply ignores the UE since this will eventually trigger a re-establishment or NAS recovery on the UE side. Another option is that RAN indicates that the verification failed to the CN which in turn takes some appropriate action, e.g. triggering a release of the UE.

In another embodiment, for a UE capability exchange based on a compression solution before AS security is activated, the hash can be provided for either the compressed or uncompressed capabilities or even both.

In another embodiment, for a RRC segmentation-based solution when the UE capability is segmented and exchanged from UE to the network before AS security is activated, the hash is provided for each segment after AS security is activated. The network can then cross check if any of the UE capability segments has been tampered with.

In another embodiment, in case of a network or UE vendor provided capability ID mapping solution, where the capability ID is exchanged from the UE to the network before AS security is activated, the hash can be provided for the capability ID after AS security activation. This would prevent corruption of the mapping between a vendor assigned UE capability ID and the UE capability in the mapping database of AMF or RAN node.

In the case of a change of UE capabilities, the UE may use a new UE capability ID or reuse the same capability ID with an indication of a delta configuration or the hash of the new capability ID. The hash of the delta configuration may be exchanged after AS security activation.

The same applies for a filtered capability request. In this case, the UE could respond with a new capability ID or capability ID together with a delta configuration indication. The hash of the new capability ID or the hash of the delta configuration should be exchanged after AS security activation.

Figure 23:
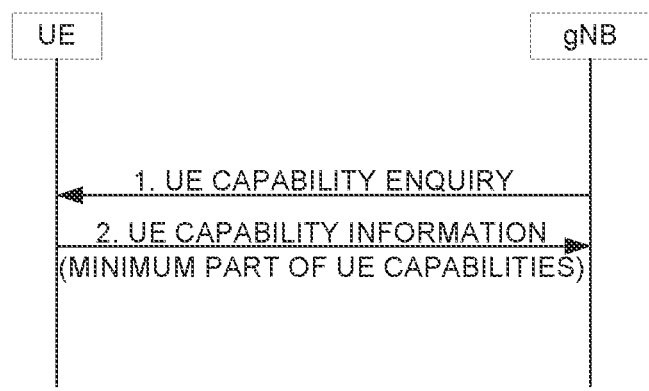
FIG. 23 is a signaling diagram for sending only a minimum part of UE capabilities before AS security activation according to some embodiments.

In this solution, the UE only sends a minimum part of the UE capabilities if AS security has not been activated. The minimum part could either be pre-defined in the standard or the network could indicate what parts are needed when it requests the UE capabilities. The full set of the UE capabilities would be transmitted later on after AS security activation. This solution could be useful in cases where certain UE capabilities (like supported bands) are needed early on to configure, for example, UE measurement reporting. An example of this solution is illustrated in FIG. 23 for the case of NR. FIG. 23 illustrates only a minimum part of UE capabilities sent before AS activation. In this example solution, the network sends the UE capability enquiry message to the UE (Step 1). Since the UE capability enquiry message was received before AS security activation, the UE only includes a minimum set of UE capabilities in the UE capability information message that is sent to the network. Note that with this solution, the capabilities acquired early may benefit from being reacquired after start of security or from the protection offered by the solutions described earlier.

In another embodiment, for a RRC segmentation based solution when the UE capabilities are segmented, the UE capability segmentation is performed in a manner where the non-sensitive/non-confidential segments of UE capabilities are exchanged before security is activated and the remaining sensitive/confidential segments of UE capabilities are exchanged after security activation. The RAN node is provisioned to process the UE capability segments individually before and after security activation. Once the attach procedure is complete, the RAN node may exchange the multiple UE capability segments as one record, towards the core network.

Another possibility is to allow the UE capabilities to be retrieved without integrity protection but only allow them to be stored in the core network or forwarded to another access node, if they were retrieved with integrity protection. In this way, manipulation of the UE capabilities by an attacker only has a local effect as the manipulated capabilities would only be used in single cell/node. This solution can be generalized by including an indication together with the UE capabilities to inform the subsequent receiver if the UE capabilities were received with integrity protection or not. When the UE capabilities are forwarded within the network (e.g., between a core network node and a radio access node, between two core network nodes, or between two radio access nodes), the receiving node could, depending on its security policy, choose to re-request the UE capabilities if they were received without integrity protection. This may be useful, for instance, in a multi-vendor network where equipment in different parts of the network are supplied by the different network vendors and where vendors have different implementations or apply different security policies.

Figure 24:
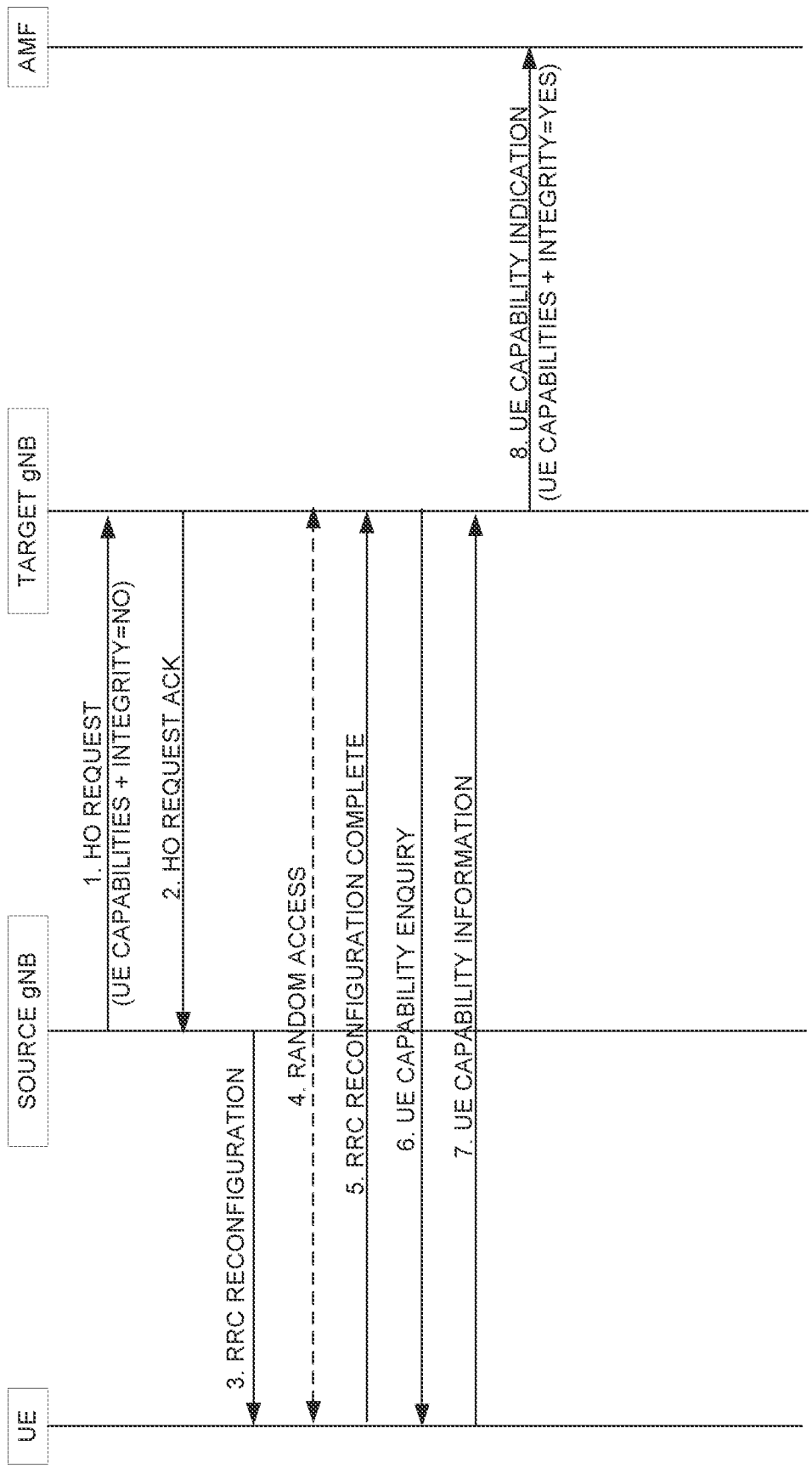
FIG. 24 is a signaling diagram for an Nx based handover in New Radio (NR), according to some embodiments.

FIG. 24 illustrates an Xn based handover in NR, where the target gNB re-requests the UE capabilities since the UE capabilities forwarded from the target gNB were received without integrity protection. As part of the handover preparation, the source gNB sends a handover request to the target gNB, which includes the UE capabilities together with an indication whether the UE capabilities were originally received integrity protected (Step 1). In this example, the UE capabilities were received without integrity protection. If the target gNB accepts the handover, it responds with a handover request acknowledge message that includes the handover command (i.e., the RRC reconfiguration message) to be sent to the UE (Step 2). The source gNB triggers the handover by sending the handover command (i.e., the RRC reconfiguration message) received in the previous step to the UE.

The UE performs random access towards the cell indicated in the handover command (Step 4). The UE sends the handover complete message to the target gNB (Step 5).

Since the UE capabilities received from the source gNB were retrieved without integrity protection, the target gNB re-requests the UE capabilities by sending a UE capability enquiry message to the UE (Step 6). Note that AS security is activated at this point, since handover can only be performed after AS security activation. The UE sends its UE capabilities to the gNB in the UE capability information message (Step 7). The target gNB uploads the newly retrieved UE capabilities to the AMF and indicates that the capabilities were retrieved with integrity protection (Step 8).

Note that the source access node could also re-fetch the UE capabilities from the UE after AS security activation, because the source access node could track the previously fetched UE capabilities that were not received with security protection. Also note that the core network node (i.e., AMF/MME), storing the UE capabilities and the indication whether they were retrieved with integrity protection, would subsequently provide both when subsequently providing the UE capabilities to the access node or to another core network node.

To trace the source of incorrectly set capabilities, an identifier of the node or cell acquiring and/or uploading the UE capabilities can be attached to and/or stored with the UE capabilities in access node(s) and/or core network node(s). When inconsistency and/or error in forwarded/stored UE capabilities is suspected or detected, this node or cell identifier can be used to identify the origin of the capabilities and aid root cause analysis.

To protect the node/cell id and/or the stored UE capabilities, the node/cell id and/or UE capabilities can be signed (or have a cryptographic authentication code attached), by the UE, access node and/or core network node.

Some embodiments herein are applicable for protection of an RRC UECapabilityInformation message which indicates radio access capabilities of a UE. Indeed, this message may prove vulnerable to tampering over-the-air when sent before AS security activation. For example, a false base station could behave as a man-in-the-middle and catch the RRC UECapabilityInformation message over-the-air. The false base station could then modify the values in the message to lower the indicated capability level and forward it to the real base station, causing the UE to operate with only limited radio capability. This could cause adverse effects on the communication between UE and network. The effect becomes worse if the tampered UE capabilities are stored in the network and are used for a long time. In some situations, it could amount to a denial of service attack on the UE.

Some embodiments accordingly refrain from using an unprotected uplink RRC UECapabilityInformation message. That is, the RRC UECapabilityInformation message shall not be sent unprotected after AS security activation. This ensures that the RRC UECapabilityInformation message cannot be tampered with after AS security activation. In more detail, this means the network should not send RRC UECapabilityEnquiry message to the UE before AS security has been activated. Alternatively or additionally, when the UE gets an RRC UECapabilityEnquiry message from a base station, the UE should first verify that AS security has been activated, i.e., an RRC security mode command procedure has been successfully performed. If the above verification succeeds, the UE shall send a corresponding RRC UECapabilityInformation message to the base station as a ciphered and integrity protected message. Else if the above verification fails, i.e., an RRC security mode command procedure has not been performed or has failed, the UE should not send RRC UECapabilityInformation message to the base station. The UE may send the RRC UECapabilityInformation message to the base station later, after AS security has been activated.

If the uplink RRC UECapabilityInformation message is used unprotected, though, such as for reason of early optimization of service/connectivity, other embodiments provide a tainting mechanism so that the system can recover from tampering of an uplink RRC UECapabilityInformation message. This allows the system to support a recovery mechanism from tampered uplink RRC UECapabilityInformation message. In more detail, according some embodiments, the network shall taint the UE capabilities if they are received in an unprotected RRC UECapabilityInformation message before AS security activation, so that the network (e.g., same gNB/AMF or different gNB/AMF at handovers) can determine whether those UE capabilities were received before or after AS security activation. Once a successful security activation is performed, depending on the security policy, the network may re-enquire the UE capabilities if they were received earlier without security protection. To re-enquire the UE capabilities, the network may send to UE a Boolean flag in AS SMCommand message, or a HASH of locally stored UE capabilities, or a new RRC UECapabilityEnqiry message.

Some embodiments therefore provide a mechanism to protect uplink RRC UECapabilityInformation message in the first place and recover from tampered uplink RRC UECapabilityInformation message if necessary.

In some embodiments, the network (gNB or AMF or any other network function) could send an indication to the UE that the UE shall not send RRC UECapabilityInformation message before AS security activation. The said indication could be send in a RRC message or a NAS message, respectively protected by AS security and NAS security. Later, when UE gets a RRC UECapabilityEnqiry message before AS security activation, the UE shall use the said indication to determine whether or not the UE replies with RRC UECapabilityInformation message before AS security activation.

Note that, in some embodiments, the RAN activates AS security (both ciphering and integrity protection) using the initial security activation procedure. The RRC messages to activate security (command and successful response) are integrity protected, while ciphering is started only after completion of the procedure. That is, the response to the message used to activate security is not ciphered, while the subsequent messages are both integrity protected and ciphered.

In one or more embodiments, the AS applies four different security keys: one for the integrity protection of RRC signalling ($K_{RRCint}$), one for the ciphering of RRC signalling ($K_{RRCenc}$), one for integrity protection of user data ($K_{UPint}$) and one for the ciphering of user data ($K_{UPenc}$). All four AS keys are derived from the $K_{gNB}$ key. The $K_{gNB}$ is based on the $K_{AMF}$ key (as specified in TS 33.501), which is handled by upper layers.

In some embodiments, the network initiates the security mode command procedure to a UE in RRC_CONNECTED. The UE shall derive the $K_gNB$ key, derive the $K_{RRCint}$ key associated with the integrityProtAlgorithm indicated in the SecurityModeCommand message, and request lower layers to verify the integrity protection of the SecurityModeCommand message, using the algorithm indicated by the integrityProtAlgorithm as included in the SecurityModeCommand message and the $K_{RRCint}$ key. If the SecurityModeCommand message passes the integrity protection check, the UE shall derive the $K_{RRCenc}$ key and the $K_{UPenc}$ key associated with the cipheringAlgorithm indicated in the SecurityModeCommand message, derive the $K_{UPint}$ key associated with the integrityProtAlgorithm indicated in the SecurityModeCommand message, configure lower layers to apply signalling radio bearer (SRB) integrity protection using the indicated algorithm and the $K_{RRCint}$ key immediately (i.e. integrity protection shall be applied to all subsequent messages received and sent by the UE, including the SecurityModeComplete message, and configure lower layers to apply SRB ciphering using the indicated algorithm, the $K_{RRCenc}$ keyafter completing the procedure (i.e. ciphering shall be applied to all subsequent messages received and sent by the UE, except for the SecurityModeComplete message which is sent unciphered). At this point, the UE shall consider AS security to be activated and submit the SecurityModeComplete message to lower layers for transmission, upon which the procedure ends. Otherwise, if the SecurityModeCommand message does not pass the integrity protection check, the UE shall continue using the configuration used prior to the reception of the SecurityModeCommand message (i.e. neither apply integrity protection nor ciphering, and submit the SecurityModeFailure message to lower layers for transmission, upon which the procedure ends.

Although the subject matter described herein may be implemented in any appropriate type of system using any suitable components, the embodiments disclosed herein are described in relation to a wireless network, such as the example wireless network illustrated in FIG. 25. For simplicity, the wireless network of FIG. 25 only depicts network 2506, network nodes 2560 and 2560b, and WDs 2510, 2510b, and 2510c. In practice, a wireless network may further include any additional elements suitable to support communication between wireless devices or between a wireless device and another communication device, such as a landline telephone, a service provider, or any other network node or end device. Of the illustrated components, network node 2560 and wireless device (WD) 2510 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 2506 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 2560 and WD 2510 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 25, network node 2560 includes processing circuitry 2570, device readable medium 2580, interface 2590, auxiliary equipment 2584, power source 2586, power circuitry 2587, and antenna 2562. Although network node 2560 illustrated in the example wireless network of FIG. 25 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 2560 are depicted as single boxes located within a larger box, or nested within multiple boxes, in practice, a network node may comprise multiple different physical components that make up a single illustrated component (e.g., device readable medium 2580 may comprise multiple separate hard drives as well as multiple RAM modules).

Similarly, network node 2560 may be composed of multiple physically separate components (e.g., a NodeB component and a RNC component, or a BTS component and a BSC component, etc.), which may each have their own respective components. In certain scenarios in which network node 2560 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 2560 may be configured to support multiple radio access technologies (RATs). In such embodiments, some components may be duplicated (e.g., separate device readable medium 2580 for the different RATs) and some components may be reused (e.g., the same antenna 2562 may be shared by the RATs). Network node 2560 may also include multiple sets of the various illustrated components for different wireless technologies integrated into network node 2560, such as, for example, GSM, WCDMA, LTE, NR, WiFi, or Bluetooth wireless technologies. These wireless technologies may be integrated into the same or different chip or set of chips and other components within network node 2560.

Processing circuitry 2570 is configured to perform any determining, calculating, or similar operations (e.g., certain obtaining operations) described herein as being provided by a network node. These operations performed by processing circuitry 2570 may include processing information obtained by processing circuitry 2570 by, for example, converting the obtained information into other information, comparing the obtained information or converted information to information stored in the network node, and/or performing one or more operations based on the obtained information or converted information, and as a result of said processing making a determination.

Processing circuitry 2570 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 2560 components, such as device readable medium 2580, network node 2560 functionality. For example, processing circuitry 2570 may execute instructions stored in device readable medium 2580 or in memory within processing circuitry 2570. Such functionality may include providing any of the various wireless features, functions, or benefits discussed herein. In some embodiments, processing circuitry 2570 may include a system on a chip (SOC).

In some embodiments, processing circuitry 2570 may include one or more of radio frequency (RF) transceiver circuitry 2572 and baseband processing circuitry 2574. In some embodiments, radio frequency (RF) transceiver circuitry 2572 and baseband processing circuitry 2574 may be on separate chips (or sets of chips), boards, or units, such as radio units and digital units. In alternative embodiments, part or all of RF transceiver circuitry 2572 and baseband processing circuitry 2574 may be on the same chip or set of chips, boards, or units In certain embodiments, some or all of the functionality described herein as being provided by a network node, base station, eNB or other such network device may be performed by processing circuitry 2570 executing instructions stored on device readable medium 2580 or memory within processing circuitry 2570. In alternative embodiments, some or all of the functionality may be provided by processing circuitry 2570 without executing instructions stored on a separate or discrete device readable medium, such as in a hard-wired manner In any of those embodiments, whether executing instructions stored on a device readable storage medium or not, processing circuitry 2570 can be configured to perform the described functionality. The benefits provided by such functionality are not limited to processing circuitry 2570 alone or to other components of network node 2560, but are enjoyed by network node 2560 as a whole, and/or by end users and the wireless network generally.

Device readable medium 2580 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 2570. Device readable medium 2580 may store any suitable instructions, data or information, including a computer program, software, an application including one or more of logic, rules, code, tables, etc. and/or other instructions capable of being executed by processing circuitry 2570 and, utilized by network node 2560. Device readable medium 2580 may be used to store any calculations made by processing circuitry 2570 and/or any data received via interface 2590. In some embodiments, processing circuitry 2570 and device readable medium 2580 may be considered to be integrated.

Interface 2590 is used in the wired or wireless communication of signalling and/or data between network node 2560, network 2506, and/or WDs 2510. As illustrated, interface 2590 comprises port(s)/terminal(s) 2594 to send and receive data, for example to and from network 2506 over a wired connection. Interface 2590 also includes radio front end circuitry 2592 that may be coupled to, or in certain embodiments a part of, antenna 2562. Radio front end circuitry 2592 comprises filters 2598 and amplifiers 2596. Radio front end circuitry 2592 may be connected to antenna 2562 and processing circuitry 2570. Radio front end circuitry may be configured to condition signals communicated between antenna 2562 and processing circuitry 2570. Radio front end circuitry 2592 may receive digital data that is to be sent out to other network nodes or WDs via a wireless connection. Radio front end circuitry 2592 may convert the digital data into a radio signal having the appropriate channel and bandwidth parameters using a combination of filters 2598 and/or amplifiers 2596. The radio signal may then be transmitted via antenna 2562. Similarly, when receiving data, antenna 2562 may collect radio signals which are then converted into digital data by radio front end circuitry 2592. The digital data may be passed to processing circuitry 2570. In other embodiments, the interface may comprise different components and/or different combinations of components.

In certain alternative embodiments, network node 2560 may not include separate radio front end circuitry 2592, instead, processing circuitry 2570 may comprise radio front end circuitry and may be connected to antenna 2562 without separate radio front end circuitry 2592. Similarly, in some embodiments, all or some of RF transceiver circuitry 2572 may be considered a part of interface 2590. In still other embodiments, interface 2590 may include one or more ports or terminals 2594, radio front end circuitry 2592, and RF transceiver circuitry 2572, as part of a radio unit (not shown), and interface 2590 may communicate with baseband processing circuitry 2574, which is part of a digital unit (not shown).

Antenna 2562 may include one or more antennas, or antenna arrays, configured to send and/or receive wireless signals. Antenna 2562 may be coupled to radio front end circuitry 2590 and may be any type of antenna capable of transmitting and receiving data and/or signals wirelessly. In some embodiments, antenna 2562 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 2562 may be separate from network node 2560 and may be connectable to network node 2560 through an interface or port.

Antenna 2562, interface 2590, and/or processing circuitry 2570 may be configured to perform any receiving operations and/or certain obtaining operations described herein as being performed by a network node. Any information, data and/or signals may be received from a wireless device, another network node and/or any other network equipment. Similarly, antenna 2562, interface 2590, and/or processing circuitry 2570 may be configured to perform any transmitting operations described herein as being performed by a network node. Any information, data and/or signals may be transmitted to a wireless device, another network node and/or any other network equipment.

Power circuitry 2587 may comprise, or be coupled to, power management circuitry and is configured to supply the components of network node 2560 with power for performing the functionality described herein. Power circuitry 2587 may receive power from power source 2586. Power source 2586 and/or power circuitry 2587 may be configured to provide power to the various components of network node 2560 in a form suitable for the respective components (e.g., at a voltage and current level needed for each respective component). Power source 2586 may either be included in, or external to, power circuitry 2587 and/or network node 2560. For example, network node 2560 may be connectable to an external power source (e.g., an electricity outlet) via an input circuitry or interface such as an electrical cable, whereby the external power source supplies power to power circuitry 2587. As a further example, power source 2586 may comprise a source of power in the form of a battery or battery pack which is connected to, or integrated in, power circuitry 2587. The battery may provide backup power should the external power source fail. Other types of power sources, such as photovoltaic devices, may also be used.

Alternative embodiments of network node 2560 may include additional components beyond those shown in FIG. 25 that may be responsible for providing certain aspects of the network node's functionality, including any of the functionality described herein and/or any functionality necessary to support the subject matter described herein. For example, network node 2560 may include user interface equipment to allow input of information into network node 2560 and to allow output of information from network node 2560. This may allow a user to perform diagnostic, maintenance, repair, and other administrative functions for network node 2560.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 2510 includes antenna 2511, interface 2514, processing circuitry 2520, device readable medium 2530, user interface equipment 2532, auxiliary equipment 2534, power source 2536 and power circuitry 2537. WD 2510 may include multiple sets of one or more of the illustrated components for different wireless technologies supported by WD 2510, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 2510.

Antenna 2511 may include one or more antennas or antenna arrays, configured to send and/or receive wireless signals, and is connected to interface 2514. In certain alternative embodiments, antenna 2511 may be separate from WD 2510 and be connectable to WD 2510 through an interface or port. Antenna 2511, interface 2514, and/or processing circuitry 2520 may be configured to perform any receiving or transmitting operations described herein as being performed by a WD. Any information, data and/or signals may be received from a network node and/or another WD. In some embodiments, radio front end circuitry and/or antenna 2511 may be considered an interface.

As illustrated, interface 2514 comprises radio front end circuitry 2512 and antenna 2511. Radio front end circuitry 2512 comprise one or more filters 2518 and amplifiers 2516. Radio front end circuitry 2514 is connected to antenna 2511 and processing circuitry 2520, and is configured to condition signals communicated between antenna 2511 and processing circuitry 2520. Radio front end circuitry 2512 may be coupled to or a part of antenna 2511. In some embodiments, WD 2510 may not include separate radio front end circuitry 2512; rather, processing circuitry 2520 may comprise radio front end circuitry and may be connected to antenna 2511. Similarly, in some embodiments, some or all of RF transceiver circuitry 2522 may be considered a part of interface 2514. Radio front end circuitry 2512 may receive digital data that is to be sent out to other network nodes or WDs via a wireless connection. Radio front end circuitry 2512 may convert the digital data into a radio signal having the appropriate channel and bandwidth parameters using a combination of filters 2518 and/or amplifiers 2516. The radio signal may then be transmitted via antenna 2511. Similarly, when receiving data, antenna 2511 may collect radio signals which are then converted into digital data by radio front end circuitry 2512. The digital data may be passed to processing circuitry 2520. In other embodiments, the interface may comprise different components and/or different combinations of components.

Processing circuitry 2520 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 2510 components, such as device readable medium 2530, WD 2510 functionality. Such functionality may include providing any of the various wireless features or benefits discussed herein. For example, processing circuitry 2520 may execute instructions stored in device readable medium 2530 or in memory within processing circuitry 2520 to provide the functionality disclosed herein.

As illustrated, processing circuitry 2520 includes one or more of RF transceiver circuitry 2522, baseband processing circuitry 2524, and application processing circuitry 2526. In other embodiments, the processing circuitry may comprise different components and/or different combinations of components. In certain embodiments processing circuitry 2520 of WD 2510 may comprise a SOC. In some embodiments, RF transceiver circuitry 2522, baseband processing circuitry 2524, and application processing circuitry 2526 may be on separate chips or sets of chips. In alternative embodiments, part or all of baseband processing circuitry 2524 and application processing circuitry 2526 may be combined into one chip or set of chips, and RF transceiver circuitry 2522 may be on a separate chip or set of chips. In still alternative embodiments, part or all of RF transceiver circuitry 2522 and baseband processing circuitry 2524 may be on the same chip or set of chips, and application processing circuitry 2526 may be on a separate chip or set of chips. In yet other alternative embodiments, part or all of RF transceiver circuitry 2522, baseband processing circuitry 2524, and application processing circuitry 2526 may be combined in the same chip or set of chips. In some embodiments, RF transceiver circuitry 2522 may be a part of interface 2514. RF transceiver circuitry 2522 may condition RF signals for processing circuitry 2520.

In certain embodiments, some or all of the functionality described herein as being performed by a WD may be provided by processing circuitry 2520 executing instructions stored on device readable medium 2530, which in certain embodiments may be a computer-readable storage medium. In alternative embodiments, some or all of the functionality may be provided by processing circuitry 2520 without executing instructions stored on a separate or discrete device readable storage medium, such as in a hard-wired manner In any of those particular embodiments, whether executing instructions stored on a device readable storage medium or not, processing circuitry 2520 can be configured to perform the described functionality. The benefits provided by such functionality are not limited to processing circuitry 2520 alone or to other components of WD 2510, but are enjoyed by WD 2510 as a whole, and/or by end users and the wireless network generally.

Processing circuitry 2520 may be configured to perform any determining, calculating, or similar operations (e.g., certain obtaining operations) described herein as being performed by a WD. These operations, as performed by processing circuitry 2520, may include processing information obtained by processing circuitry 2520 by, for example, converting the obtained information into other information, comparing the obtained information or converted information to information stored by WD 2510, and/or performing one or more operations based on the obtained information or converted information, and as a result of said processing making a determination.

Device readable medium 2530 may be operable to store a computer program, software, an application including one or more of logic, rules, code, tables, etc. and/or other instructions capable of being executed by processing circuitry 2520. Device readable medium 2530 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 2520. In some embodiments, processing circuitry 2520 and device readable medium 2530 may be considered to be integrated.

User interface equipment 2532 may provide components that allow for a human user to interact with WD 2510. Such interaction may be of many forms, such as visual, audial, tactile, etc. User interface equipment 2532 may be operable to produce output to the user and to allow the user to provide input to WD 2510. The type of interaction may vary depending on the type of user interface equipment 2532 installed in WD 2510. For example, if WD 2510 is a smart phone, the interaction may be via a touch screen; if WD 2510 is a smart meter, the interaction may be through a screen that provides usage (e.g., the number of gallons used) or a speaker that provides an audible alert (e.g., if smoke is detected). User interface equipment 2532 may include input interfaces, devices and circuits, and output interfaces, devices and circuits. User interface equipment 2532 is configured to allow input of information into WD 2510, and is connected to processing circuitry 2520 to allow processing circuitry 2520 to process the input information. User interface equipment 2532 may include, for example, a microphone, a proximity or other sensor, keys/buttons, a touch display, one or more cameras, a USB port, or other input circuitry. User interface equipment 2532 is also configured to allow output of information from WD 2510, and to allow processing circuitry 2520 to output information from WD 2510. User interface equipment 2532 may include, for example, a speaker, a display, vibrating circuitry, a USB port, a headphone interface, or other output circuitry. Using one or more input and output interfaces, devices, and circuits, of user interface equipment 2532, WD 2510 may communicate with end users and/or the wireless network, and allow them to benefit from the functionality described herein.

Auxiliary equipment 2534 is operable to provide more specific functionality which may not be generally performed by WDs. This may comprise specialized sensors for doing measurements for various purposes, interfaces for additional types of communication such as wired communications etc. The inclusion and type of components of auxiliary equipment 2534 may vary depending on the embodiment and/or scenario.

Power source 2536 may, in some embodiments, be in the form of a battery or battery pack. Other types of power sources, such as an external power source (e.g., an electricity outlet), photovoltaic devices or power cells, may also be used. WD 2510 may further comprise power circuitry 2537 for delivering power from power source 2536 to the various parts of WD 2510 which need power from power source 2536 to carry out any functionality described or indicated herein. Power circuitry 2537 may in certain embodiments comprise power management circuitry. Power circuitry 2537 may additionally or alternatively be operable to receive power from an external power source; in which case WD 2510 may be connectable to the external power source (such as an electricity outlet) via input circuitry or an interface such as an electrical power cable. Power circuitry 2537 may also in certain embodiments be operable to deliver power from an external power source to power source 2536. This may be, for example, for the charging of power source 2536. Power circuitry 2537 may perform any formatting, converting, or other modification to the power from power source 2536 to make the power suitable for the respective components of WD 2510 to which power is supplied.

Figure 26:
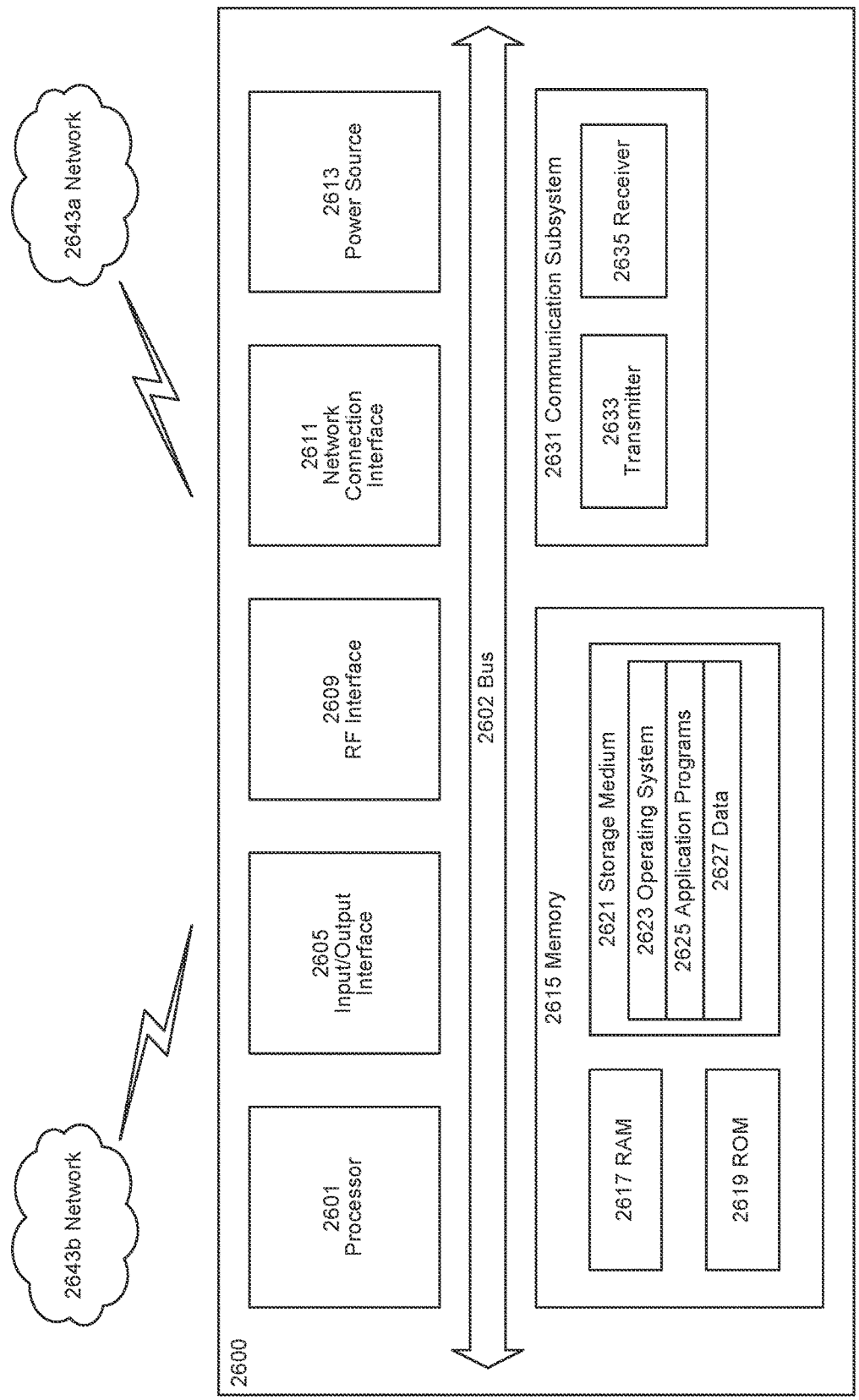
FIG. 26 is a block diagram of a user equipment according to some embodiments.

FIG. 26 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 26200 may be any UE identified by the $3^{rd}$ Generation Partnership Project (3GPP), including a NB-IoT UE, a machine type communication (MTC) UE, and/or an enhanced MTC (eMTC) UE. UE 2600, as illustrated in FIG. 26, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 26 is a UE, the components discussed herein are equally applicable to a WD, and vice-versa.

In FIG. 26, UE 2600 includes processing circuitry 2601 that is operatively coupled to input/output interface 2605, radio frequency (RF) interface 2609, network connection interface 2611, memory 2615 including random access memory (RAM) 2617, read-only memory (ROM) 2619, and storage medium 2621 or the like, communication subsystem 2631, power source 2633, and/or any other component, or any combination thereof. Storage medium 2621 includes operating system 2623, application program 2625, and data 2627. In other embodiments, storage medium 2621 may include other similar types of information. Certain UEs may utilize all of the components shown in FIG. 26, or only a subset of the components. The level of integration between the components may vary from one UE to another UE. Further, certain UEs may contain multiple instances of a component, such as multiple processors, memories, transceivers, transmitters, receivers, etc.

In FIG. 26, processing circuitry 2601 may be configured to process computer instructions and data. Processing circuitry 2601 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 2601 may include two central processing units (CPUs). Data may be information in a form suitable for use by a computer.

In the depicted embodiment, input/output interface 2605 may be configured to provide a communication interface to an input device, output device, or input and output device. UE 2600 may be configured to use an output device via input/output interface 2605. An output device may use the same type of interface port as an input device. For example, a USB port may be used to provide input to and output from UE 2600. The output device may be a speaker, a sound card, a video card, a display, a monitor, a printer, an actuator, an emitter, a smartcard, another output device, or any combination thereof. UE 2600 may be configured to use an input device via input/output interface 2605 to allow a user to capture information into UE 2600. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 26, RF interface 2609 may be configured to provide a communication interface to RF components such as a transmitter, a receiver, and an antenna. Network connection interface 2611 may be configured to provide a communication interface to network 2643a. Network 2643a may encompass wired and/or wireless networks such as a local-area network (LAN), a wide-area network (WAN), a computer network, a wireless network, a telecommunications network, another like network or any combination thereof. For example, network 2643*a* may comprise a Wi-Fi network. Network connection interface 2611 may be configured to include a receiver and a transmitter interface used to communicate with one or more other devices over a communication network according to one or more communication protocols, such as Ethernet, TCP/IP, SONET, ATM, or the like. Network connection interface 2611 may implement receiver and transmitter functionality appropriate to the communication network links (e.g., optical, electrical, and the like). The transmitter and receiver functions may share circuit components, software or firmware, or alternatively may be implemented separately.

RAM 2617 may be configured to interface via bus 2602 to processing circuitry 2601 to provide storage or caching of data or computer instructions during the execution of software programs such as the operating system, application programs, and device drivers. ROM 2619 may be configured to provide computer instructions or data to processing circuitry 2601. For example, ROM 2619 may be configured to store invariant low-level system code or data for basic system functions such as basic input and output (I/O), startup, or reception of keystrokes from a keyboard that are stored in a non-volatile memory. Storage medium 2621 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 2621 may be configured to include operating system 2623, application program 2625 such as a web browser application, a widget or gadget engine or another application, and data file 2627. Storage medium 2621 may store, for use by UE 2600, any of a variety of various operating systems or combinations of operating systems.

Storage medium 2621 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 2621 may allow UE 2600 to access computer-executable instructions, application programs or the like, stored on transitory or non-transitory memory media, to off-load data, or to upload data. An article of manufacture, such as one utilizing a communication system may be tangibly embodied in storage medium 2621, which may comprise a device readable medium.

In FIG. 26, processing circuitry 2601 may be configured to communicate with network 2643*b* using communication subsystem 2631. Network 2643*a* and network 2643*b* may be the same network or networks or different network or networks. Communication subsystem 2631 may be configured to include one or more transceivers used to communicate with network 2643*b*. For example, communication subsystem 2631 may be configured to include one or more transceivers used to communicate with one or more remote transceivers of another device capable of wireless communication such as another WD, UE, or base station of a radio access network (RAN) according to one or more communication protocols, such as IEEE 802.26, CDMA, WCDMA, GSM, LTE, UTRAN, WiMax, or the like. Each transceiver may include transmitter 2633 and/or receiver 2635 to implement transmitter or receiver functionality, respectively, appropriate to the RAN links (e.g., frequency allocations and the like). Further, transmitter 2633 and receiver 2635 of each transceiver may share circuit components, software or firmware, or alternatively may be implemented separately.

In the illustrated embodiment, the communication functions of communication subsystem 2631 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 2631 may include cellular communication, Wi-Fi communication, Bluetooth communication, and GPS communication. Network 2643*b* may encompass wired and/or wireless networks such as a local-area network (LAN), a wide-area network (WAN), a computer network, a wireless network, a telecommunications network, another like network or any combination thereof. For example, network 2643*b* may be a cellular network, a Wi-Fi network, and/or a near-field network. Power source 2613 may be configured to provide alternating current (AC) or direct current (DC) power to components of UE 2600.

The features, benefits and/or functions described herein may be implemented in one of the components of UE 2600 or partitioned across multiple components of UE 2600. Further, the features, benefits, and/or functions described herein may be implemented in any combination of hardware, software or firmware. In one example, communication subsystem 2631 may be configured to include any of the components described herein. Further, processing circuitry 2601 may be configured to communicate with any of such components over bus 2602. In another example, any of such components may be represented by program instructions stored in memory that when executed by processing circuitry 2601 perform the corresponding functions described herein. In another example, the functionality of any of such components may be partitioned between processing circuitry 2601 and communication subsystem 2631. In another example, the non-computationally intensive functions of any of such components may be implemented in software or firmware and the computationally intensive functions may be implemented in hardware.

Figure 27:
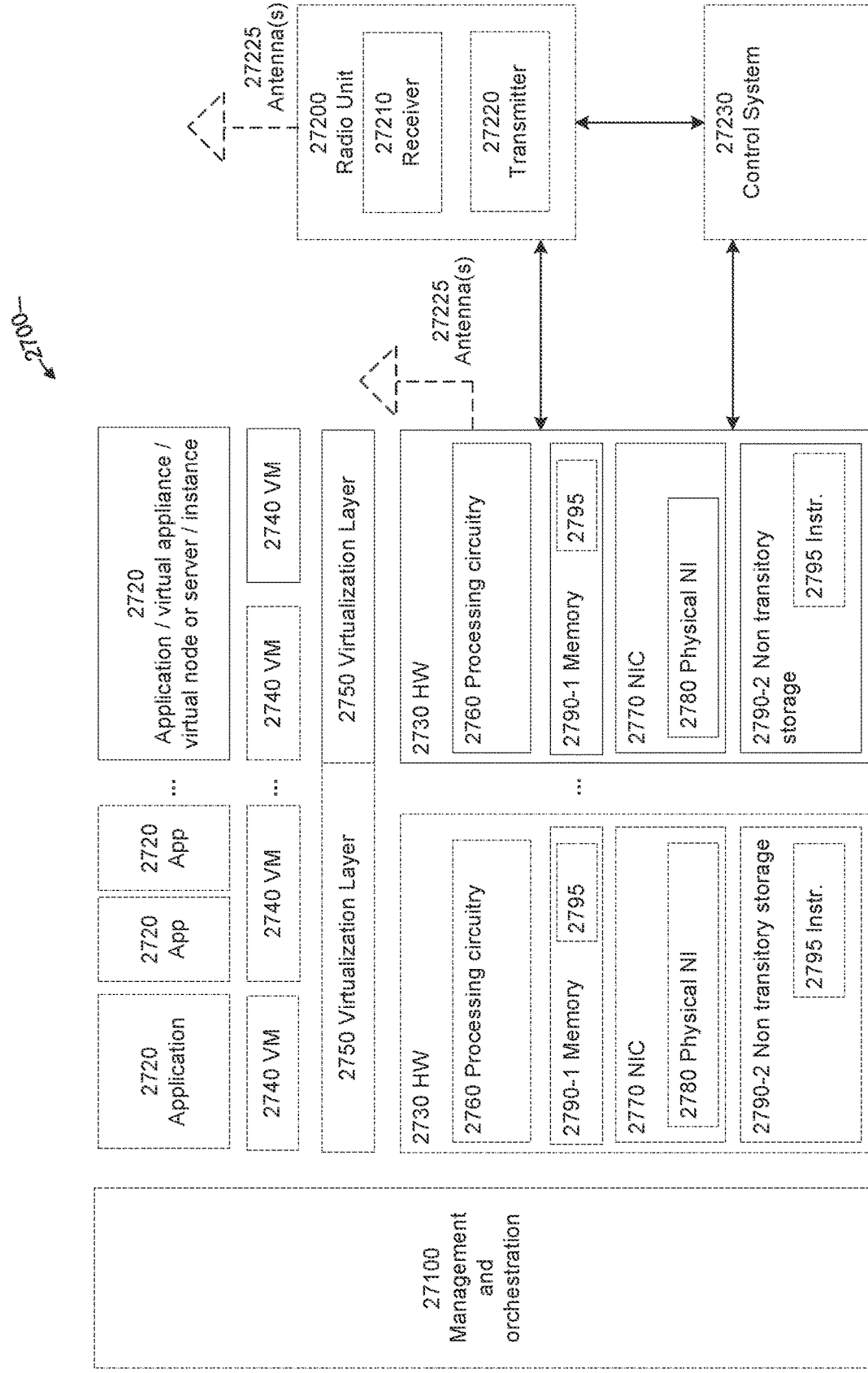
FIG. 27 is a block diagram of a virtualization environment according to some embodiments.

FIG. 27 is a schematic block diagram illustrating a virtualization environment 2700 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 2700 hosted by one or more of hardware nodes 2730. Further, in embodiments in which the virtual node is not a radio access node or does not require radio connectivity (e.g., a core network node), then the network node may be entirely virtualized.

The functions may be implemented by one or more applications 2720 (which may alternatively be called software instances, virtual appliances, network functions, virtual nodes, virtual network functions, etc.) operative to implement some of the features, functions, and/or benefits of some of the embodiments disclosed herein. Applications 2720 are run in virtualization environment 2700 which provides hardware 2730 comprising processing circuitry 2760 and memory 2790. Memory 2790 contains instructions 2795 executable by processing circuitry 2760 whereby application 2720 is operative to provide one or more of the features, benefits, and/or functions disclosed herein.

Virtualization environment 2700, comprises general-purpose or special-purpose network hardware devices 2730 comprising a set of one or more processors or processing circuitry 2760, which may be commercial off-the-shelf (COTS) processors, dedicated Application Specific Integrated Circuits (ASICs), or any other type of processing circuitry including digital or analog hardware components or special purpose processors. Each hardware device may comprise memory 2790-1 which may be non-persistent memory for temporarily storing instructions 2795 or software executed by processing circuitry 2760. Each hardware device may comprise one or more network interface controllers (NICs) 2770, also known as network interface cards, which include physical network interface 2780. Each hardware device may also include non-transitory, persistent, machine-readable storage media 2790-2 having stored therein software 2795 and/or instructions executable by processing circuitry 2760. Software 2795 may include any type of software including software for instantiating one or more virtualization layers 2750 (also referred to as hypervisors), software to execute virtual machines 2740 as well as software allowing it to execute functions, features and/or benefits described in relation with some embodiments described herein.

Virtual machines 2740, comprise virtual processing, virtual memory, virtual networking or interface and virtual storage, and may be run by a corresponding virtualization layer 2750 or hypervisor. Different embodiments of the instance of virtual appliance 2720 may be implemented on one or more of virtual machines 2740, and the implementations may be made in different ways.

During operation, processing circuitry 2760 executes software 2795 to instantiate the hypervisor or virtualization layer 2750, which may sometimes be referred to as a virtual machine monitor (VMM). Virtualization layer 2750 may present a virtual operating platform that appears like networking hardware to virtual machine 2740.

As shown in FIG. 27, hardware 2730 may be a standalone network node with generic or specific components. Hardware 2730 may comprise antenna 27225 and may implement some functions via virtualization. Alternatively, hardware 2730 may be part of a larger cluster of hardware (e.g. such as in a data center or customer premise equipment (CPE)) where many hardware nodes work together and are managed via management and orchestration (MANO) 27100, which, among others, oversees lifecycle management of applications 2720.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 2740 may be a software implementation of a physical machine that runs programs as if they were executing on a physical, non-virtualized machine. Each of virtual machines 2740, and that part of hardware 2730 that executes that virtual machine, be it hardware dedicated to that virtual machine and/or hardware shared by that virtual machine with others of the virtual machines 2740, forms a separate virtual network elements (VNE).

Still in the context of NFV, Virtual Network Function (VNF) is responsible for handling specific network functions that run in one or more virtual machines 2740 on top of hardware networking infrastructure 2730 and corresponds to application 2720 in FIG. 27.

In some embodiments, one or more radio units 27200 that each include one or more transmitters 27220 and one or more receivers 27210 may be coupled to one or more antennas 27225. Radio units 27200 may communicate directly with hardware nodes 2730 via one or more appropriate network interfaces and may be used in combination with the virtual components to provide a virtual node with radio capabilities, such as a radio access node or a base station.

In some embodiments, some signalling can be effected with the use of control system 27230 which may alternatively be used for communication between the hardware nodes 2730 and radio units 27200.

Figure 28:
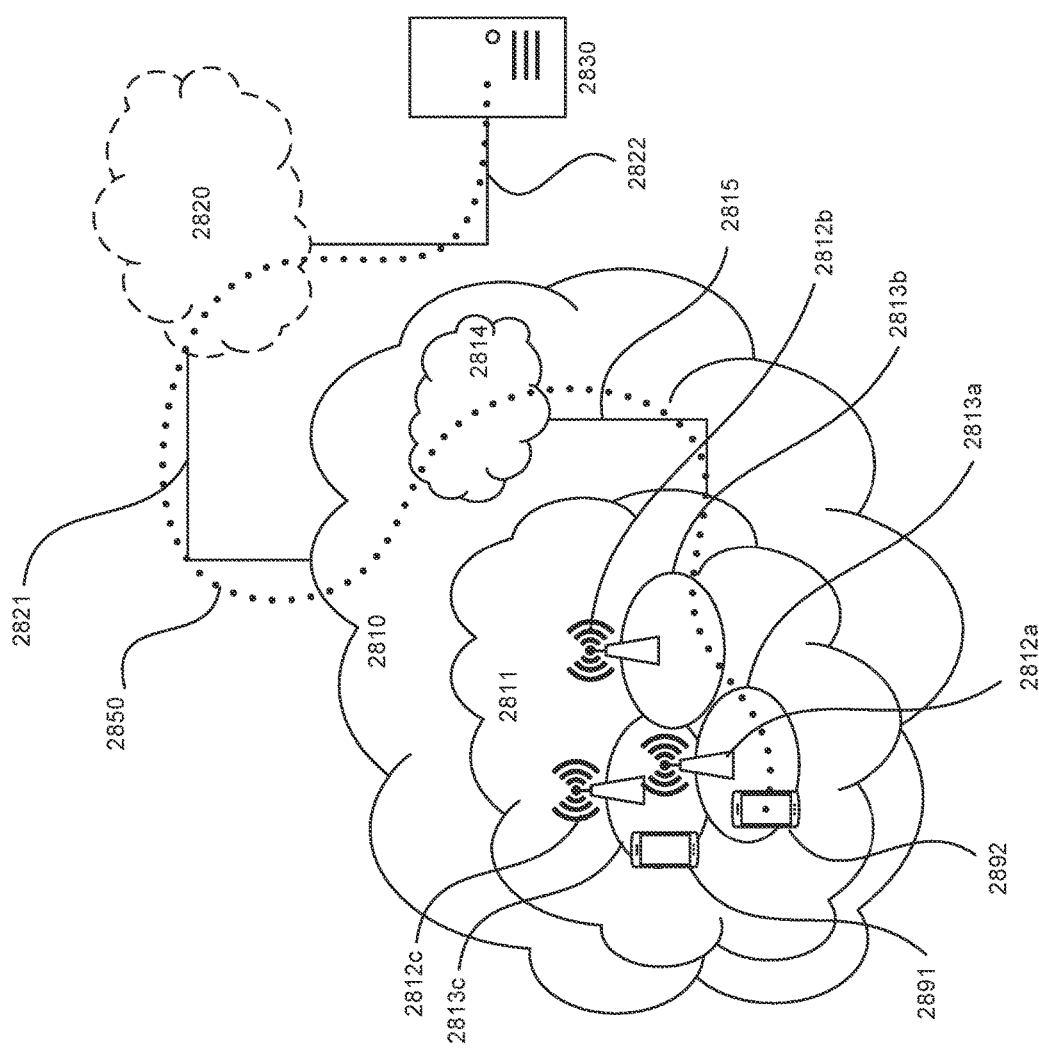
FIG. 28 is a block diagram of a communication network with a host computer according to some embodiments.

FIG. 28 illustrates a telecommunication network connected via an intermediate network to a host computer in accordance with some embodiments. In particular, with reference to FIG. 28, in accordance with an embodiment, a communication system includes telecommunication network 2810, such as a 3GPP-type cellular network, which comprises access network 2811, such as a radio access network, and core network 2814. Access network 2811 comprises a plurality of base stations 2812a, 2812b, 2812c, such as NBs, eNBs, gNBs or other types of wireless access points, each defining a corresponding coverage area 2813a, 2813b, 2813c. Each base station 2812a, 2812b, 2812c is connectable to core network 2814 over a wired or wireless connection 2815. A first UE 2891 located in coverage area 2813c is configured to wirelessly connect to, or be paged by, the corresponding base station 2812c. A second UE 2892 in coverage area 2813a is wirelessly connectable to the corresponding base station 2812a. While a plurality of UEs 2891, 2892 are illustrated in this example, the disclosed embodiments are equally applicable to a situation where a sole UE is in the coverage area or where a sole UE is connecting to the corresponding base station 2812.

Telecommunication network 2810 is itself connected to host computer 2830, which may be embodied in the hardware and/or software of a standalone server, a cloud-implemented server, a distributed server or as processing resources in a server farm. Host computer 2830 may be under the ownership or control of a service provider, or may be operated by the service provider or on behalf of the service provider. Connections 2821 and 2822 between telecommunication network 2810 and host computer 2830 may extend directly from core network 2814 to host computer 2830 or may go via an optional intermediate network 2820. Intermediate network 2820 may be one of, or a combination of more than one of, a public, private or hosted network; intermediate network 2820, if any, may be a backbone network or the Internet; in particular, intermediate network 2820 may comprise two or more sub-networks (not shown).

The communication system of FIG. 28 as a whole enables connectivity between the connected UEs 2891, 2892 and host computer 2830. The connectivity may be described as an over-the-top (OTT) connection 2850. Host computer 2830 and the connected UEs 2891, 2892 are configured to communicate data and/or signaling via OTT connection 2850, using access network 2811, core network 2814, any intermediate network 2820 and possible further infrastructure (not shown) as intermediaries. OTT connection 2850 may be transparent in the sense that the participating communication devices through which OTT connection 2850 passes are unaware of routing of uplink and downlink communications. For example, base station 2812 may not or need not be informed about the past routing of an incoming downlink communication with data originating from host computer 2830 to be forwarded (e.g., handed over) to a connected UE 2891. Similarly, base station 2812 need not be aware of the future routing of an outgoing uplink communication originating from the UE 2891 towards the host computer 2830.

Figure 29:
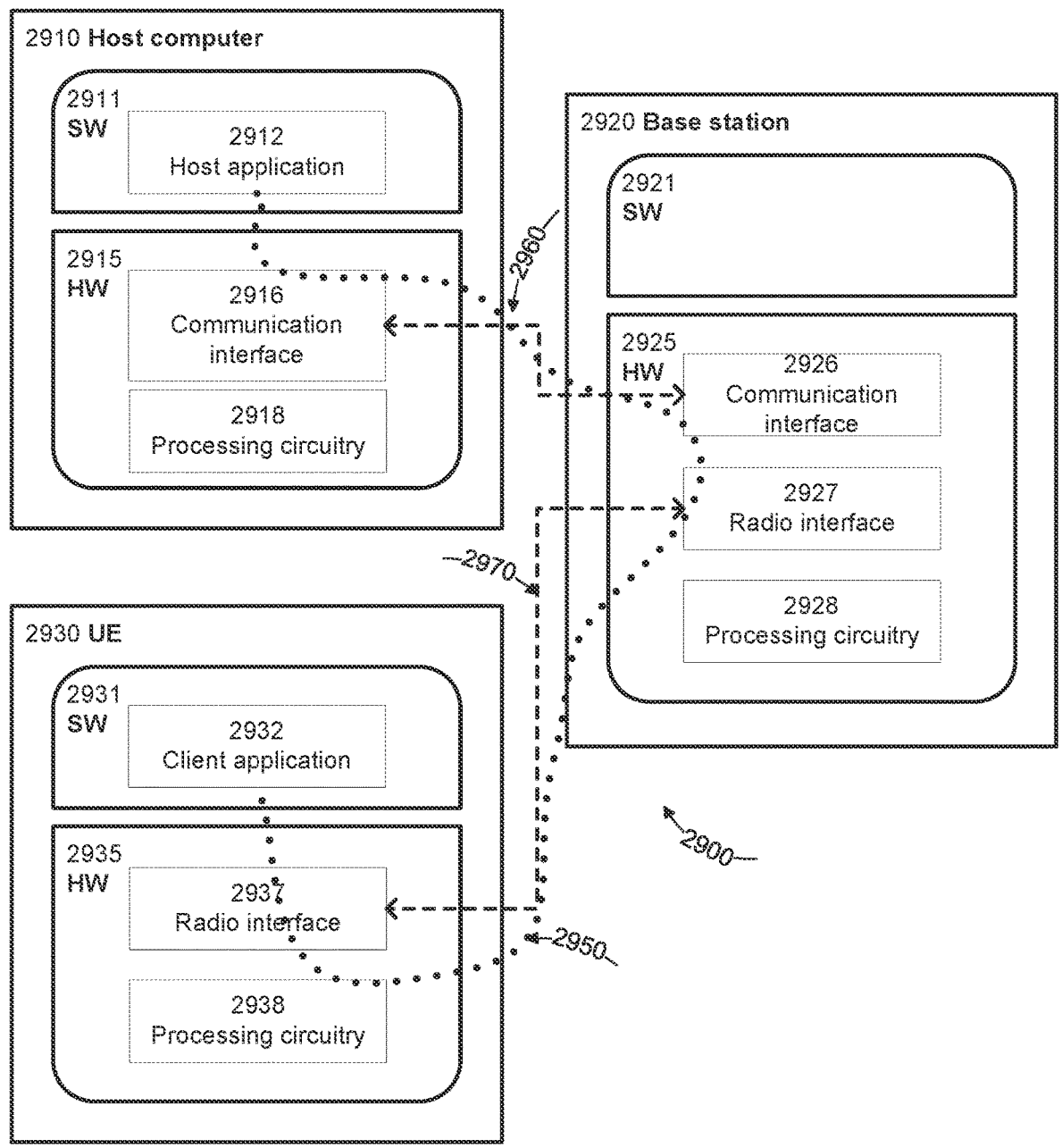
FIG. 29 is a block diagram of a host computer according to some embodiments.

Example implementations, in accordance with an embodiment, of the UE, base station and host computer discussed in the preceding paragraphs will now be described with reference to FIG. 29. FIG. 29 illustrates host computer communicating via a base station with a user equipment over a partially wireless connection in accordance with some embodiments In communication system 2900, host computer 2910 comprises hardware 2915 including communication interface 2916 configured to set up and maintain a wired or wireless connection with an interface of a different communication device of communication system 2900. Host computer 2910 further comprises processing circuitry 2918, which may have storage and/or processing capabilities. In particular, processing circuitry 2918 may comprise one or more programmable processors, application-specific integrated circuits, field programmable gate arrays or combinations of these (not shown) adapted to execute instructions. Host computer 2910 further comprises software 2911, which is stored in or accessible by host computer 2910 and executable by processing circuitry 2918. Software 2911 includes host application 2912. Host application 2912 may be operable to provide a service to a remote user, such as UE 2930 connecting via OTT connection 2950 terminating at UE 2930 and host computer 2910. In providing the service to the remote user, host application 2912 may provide user data which is transmitted using OTT connection 2950.

Communication system 2900 further includes base station 2920 provided in a telecommunication system and comprising hardware 2925 enabling it to communicate with host computer 2910 and with UE 2930. Hardware 2925 may include communication interface 2926 for setting up and maintaining a wired or wireless connection with an interface of a different communication device of communication system 2900, as well as radio interface 2927 for setting up and maintaining at least wireless connection 2970 with UE 2930 located in a coverage area (not shown in FIG. 29) served by base station 2920. Communication interface 2926 may be configured to facilitate connection 2960 to host computer 2910. Connection 2960 may be direct or it may pass through a core network (not shown in FIG. 29) of the telecommunication system and/or through one or more intermediate networks outside the telecommunication system. In the embodiment shown, hardware 2925 of base station 2920 further includes processing circuitry 2928, which may comprise one or more programmable processors, application-specific integrated circuits, field programmable gate arrays or combinations of these (not shown) adapted to execute instructions. Base station 2920 further has software 2921 stored internally or accessible via an external connection.

Communication system 2900 further includes UE 2930 already referred to. Its hardware 2935 may include radio interface 2937 configured to set up and maintain wireless connection 2970 with a base station serving a coverage area in which UE 2930 is currently located. Hardware 2935 of UE 2930 further includes processing circuitry 2938, which may comprise one or more programmable processors, application-specific integrated circuits, field programmable gate arrays or combinations of these (not shown) adapted to execute instructions. UE 2930 further comprises software 2931, which is stored in or accessible by UE 2930 and executable by processing circuitry 2938. Software 2931 includes client application 2932. Client application 2932 may be operable to provide a service to a human or non-human user via UE 2930, with the support of host computer 2910. In host computer 2910, an executing host application 2912 may communicate with the executing client application 2932 via OTT connection 2950 terminating at UE 2930 and host computer 2910. In providing the service to the user, client application 2932 may receive request data from host application 2912 and provide user data in response to the request data. OTT connection 2950 may transfer both the request data and the user data. Client application 2932 may interact with the user to generate the user data that it provides.

It is noted that host computer 2910, base station 2920 and UE 2930 illustrated in FIG. 29 may be similar or identical to host computer 2830, one of base stations 2812a, 2812b, 2812c and one of UEs 2891, 2892 of FIG. 28, respectively. This is to say, the inner workings of these entities may be as shown in FIG. 29 and independently, the surrounding network topology may be that of FIG. 28.

In FIG. 29, OTT connection 2950 has been drawn abstractly to illustrate the communication between host computer 2910 and UE 2930 via base station 2920, without explicit reference to any intermediary devices and the precise routing of messages via these devices. Network infrastructure may determine the routing, which it may be configured to hide from UE 2930 or from the service provider operating host computer 2910, or both. While OTT connection 2950 is active, the network infrastructure may further take decisions by which it dynamically changes the routing (e.g., on the basis of load balancing consideration or reconfiguration of the network).

Wireless connection 2970 between UE 2930 and base station 2920 is in accordance with the teachings of the embodiments described throughout this disclosure. One or more of the various embodiments improve the performance of OTT services provided to UE 2930 using OTT connection 2950, in which wireless connection 2970 forms the last segment. More precisely, the teachings of these embodiments help to prevent an attacker from manipulating the UE capabilities transmitted over-the-air and thereby causing damage to the network or UE, e.g., service degradation. The embodiments also provide the advantage of mitigating privacy risk. This provides benefits such as increased security and privacy for users, as well as better network and UE performance.

A measurement procedure may be provided for the purpose of monitoring data rate, latency and other factors on which the one or more embodiments improve. There may further be an optional network functionality for reconfiguring OTT connection 2950 between host computer 2910 and UE 2930, in response to variations in the measurement results. The measurement procedure and/or the network functionality for reconfiguring OTT connection 2950 may be implemented in software 2911 and hardware 2915 of host computer 2910 or in software 2931 and hardware 2935 of UE 2930, or both. In embodiments, sensors (not shown) may be deployed in or in association with communication devices through which OTT connection 2950 passes; the sensors may participate in the measurement procedure by supplying values of the monitored quantities exemplified above, or supplying values of other physical quantities from which software 2911, 2931 may compute or estimate the monitored quantities. The reconfiguring of OTT connection 2950 may include message format, retransmission settings, preferred routing etc.; the reconfiguring need not affect base station 2920, and it may be unknown or imperceptible to base station 2920. Such procedures and functionalities may be known and practiced in the art. In certain embodiments, measurements may involve proprietary UE signaling facilitating host computer 2910's measurements of throughput, propagation times, latency and the like. The measurements may be implemented in that software 2911 and 2931 causes messages to be transmitted, in particular empty or 'dummy' messages, using OTT connection 2950 while it monitors propagation times, errors etc.

Figure 30:
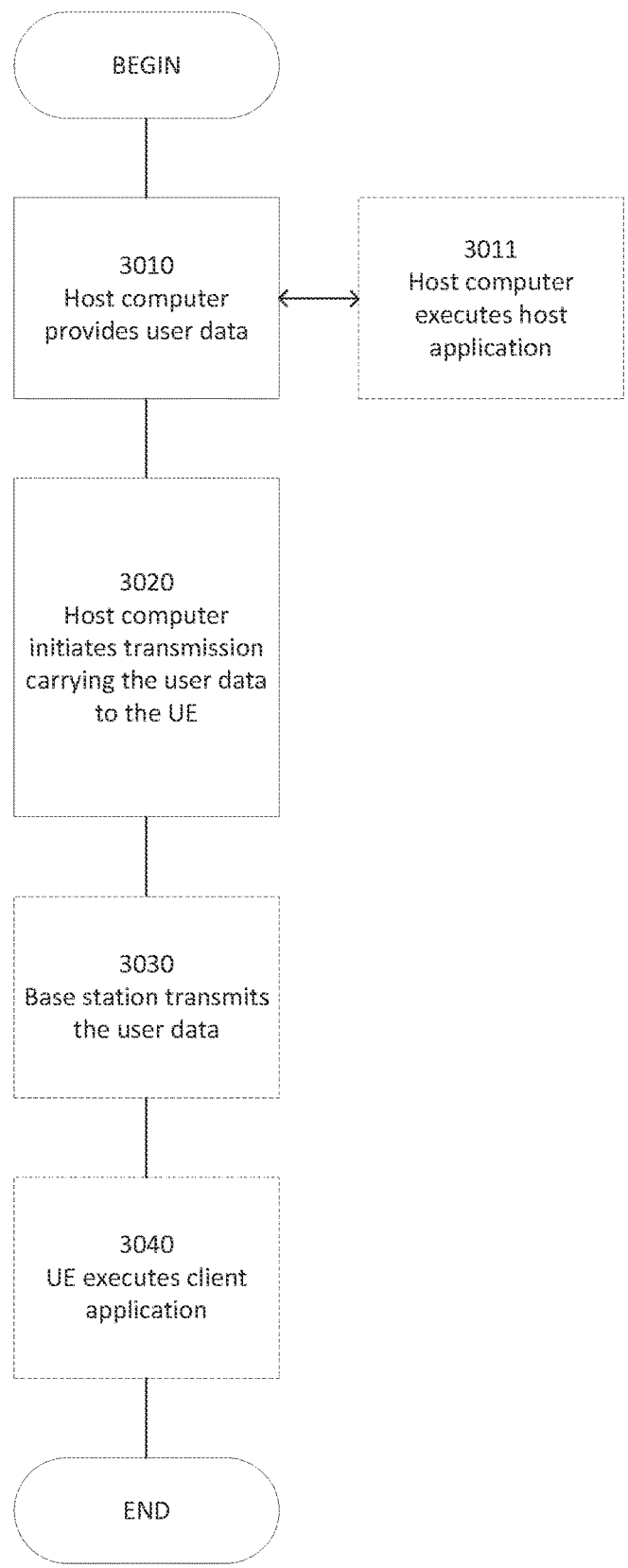
FIG. 30 is a flowchart illustrating a method implemented in a communication system, in accordance with one embodiment.

FIG. 30 is a flowchart illustrating a method implemented in a communication system, in accordance with one embodiment. The communication system includes a host computer, a base station and a UE which may be those described with reference to FIGS. 28 and 29. For simplicity of the present disclosure, only drawing references to FIG. 30 will be included in this section. In step 3010, the host computer provides user data. In substep 3011 (which may be optional) of step 3010, the host computer provides the user data by executing a host application. In step 3020, the host computer initiates a transmission carrying the user data to the UE. In step 3030 (which may be optional), the base station transmits to the UE the user data which was carried in the transmission that the host computer initiated, in accordance with the teachings of the embodiments described throughout this disclosure. In step 3040 (which may also be optional), the UE executes a client application associated with the host application executed by the host computer.

Figure 31:
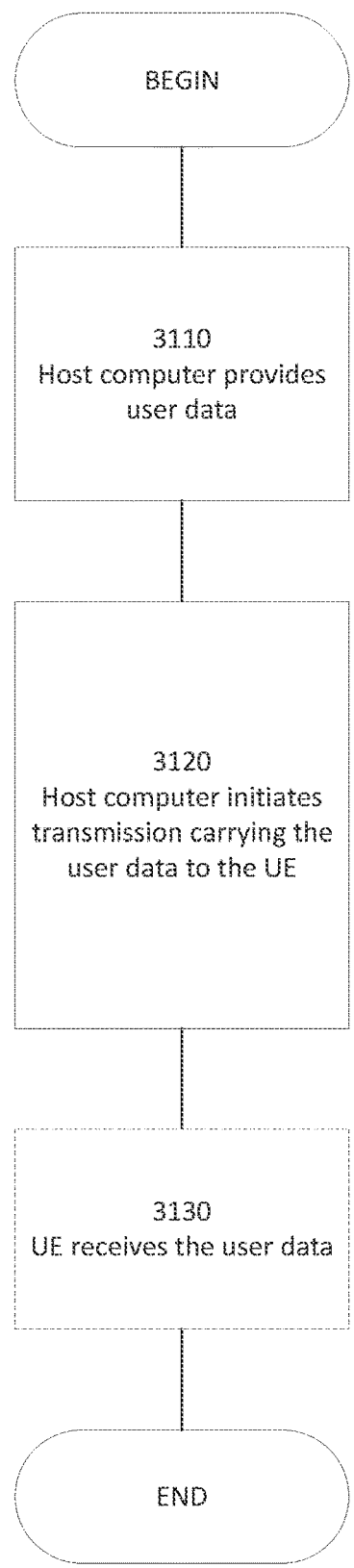
FIG. 31 is a flowchart illustrating a method implemented in a communication system, in accordance with one embodiment.

FIG. 31 is a flowchart illustrating a method implemented in a communication system, in accordance with one embodiment. The communication system includes a host computer, a base station and a UE which may be those described with reference to FIGS. 28 and 29. For simplicity of the present disclosure, only drawing references to FIG. 31 will be included in this section. In step 3110 of the method, the host computer provides user data. In an optional substep (not shown) the host computer provides the user data by executing a host application. In step 3120, the host computer initiates a transmission carrying the user data to the UE. The transmission may pass via the base station, in accordance with the teachings of the embodiments described throughout this disclosure. In step 3130 (which may be optional), the UE receives the user data carried in the transmission.

Figure 32:
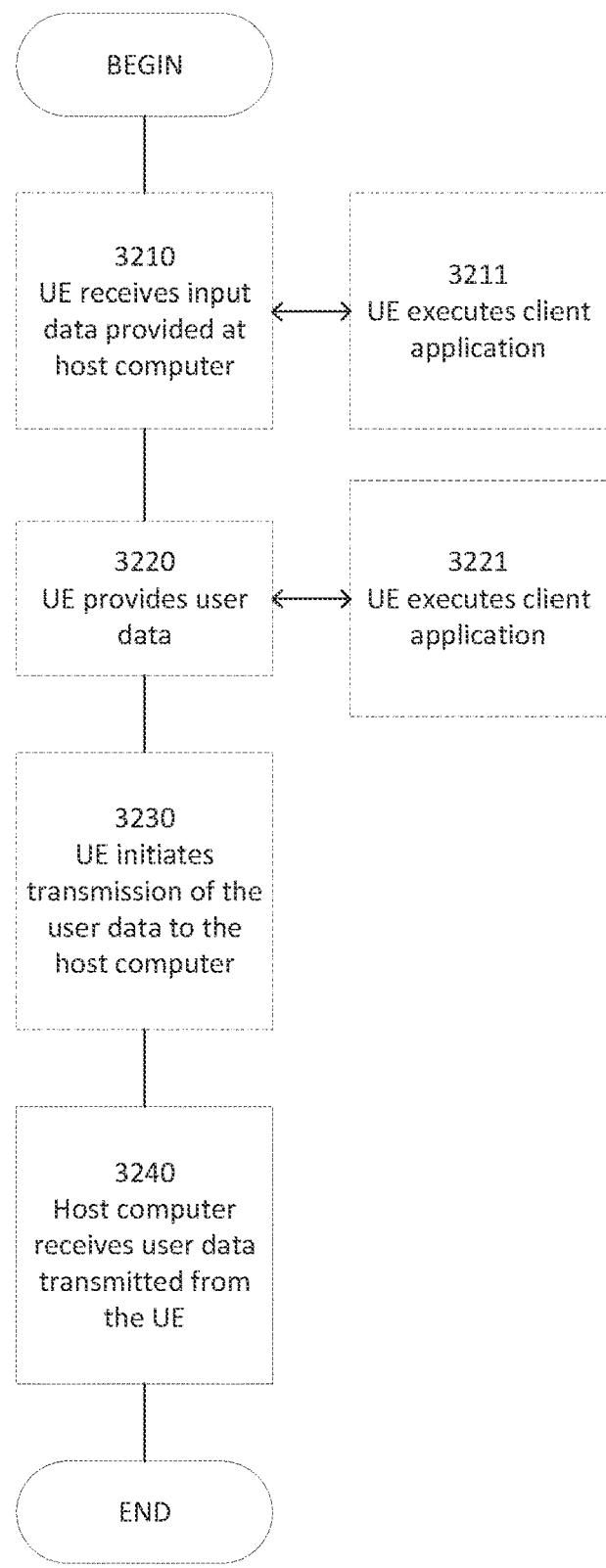
FIG. 32 is a flowchart illustrating a method implemented in a communication system, in accordance with one embodiment.

FIG. 32 is a flowchart illustrating a method implemented in a communication system, in accordance with one embodiment. The communication system includes a host computer, a base station and a UE which may be those described with reference to FIGS. 28 and 29. For simplicity of the present disclosure, only drawing references to FIG. 32 will be included in this section. In step 3210 (which may be optional), the UE receives input data provided by the host computer. Additionally or alternatively, in step 3220, the UE provides user data. In substep 3221 (which may be optional) of step 3220, the UE provides the user data by executing a client application. In substep 3211 (which may be optional) of step 3210, the UE executes a client application which provides the user data in reaction to the received input data provided by the host computer. In providing the user data, the executed client application may further consider user input received from the user. Regardless of the specific manner in which the user data was provided, the UE initiates, in substep 3230 (which may be optional), transmission of the user data to the host computer. In step 3240 of the method, the host computer receives the user data transmitted from the UE, in accordance with the teachings of the embodiments described throughout this disclosure.

Figure 33:
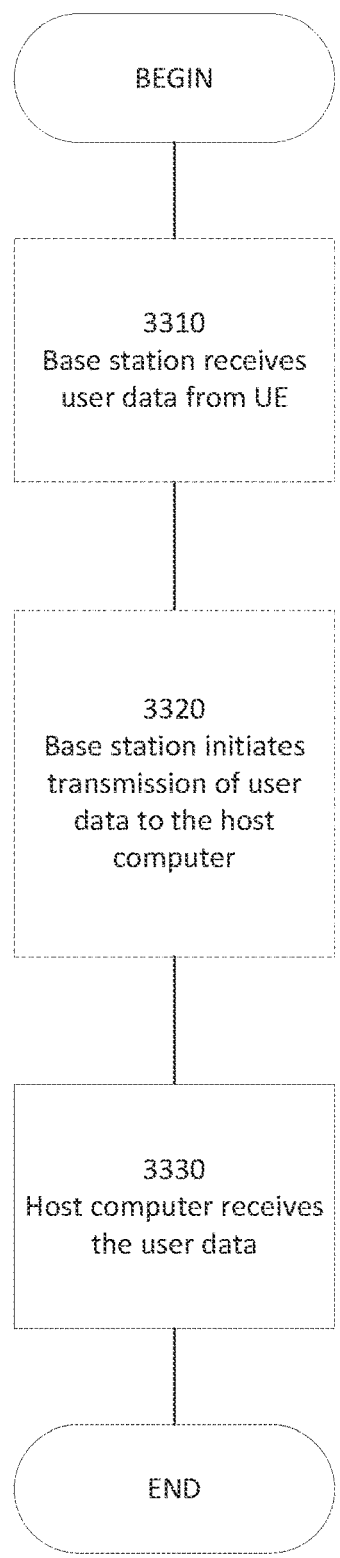
FIG. 33 is a flowchart illustrating a method implemented in a communication system, in accordance with one embodiment.

FIG. 33 is a flowchart illustrating a method implemented in a communication system, in accordance with one embodiment. The communication system includes a host computer, a base station and a UE which may be those described with reference to FIGS. 28 and 29. For simplicity of the present disclosure, only drawing references to FIG. 33 will be included in this section. In step 3310 (which may be optional), in accordance with the teachings of the embodiments described throughout this disclosure, the base station receives user data from the UE. In step 3320 (which may be optional), the base station initiates transmission of the received user data to the host computer. In step 3330 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

In view of the above, then, embodiments herein generally include a communication system including a host computer. The host computer may comprise processing circuitry configured to provide user data. The host computer may also comprise a communication interface configured to forward the user data to a cellular network for transmission to a user equipment (UE). The cellular network may comprise a base station having a radio interface and processing circuitry, the base station's processing circuitry configured to perform any of the steps of any of the embodiments described above for a base station.

In some embodiments, the communication system further includes the base station.

In some embodiments, the communication system further includes the UE, wherein the UE is configured to communicate with the base station.

In some embodiments, the processing circuitry of the host computer is configured to execute a host application, thereby providing the user data. In this case, the UE comprises processing circuitry configured to execute a client application associated with the host application.

Embodiments herein also include a method implemented in a communication system including a host computer, a base station and a user equipment (UE). The method comprises, at the host computer, providing user data. The method may also comprise, at the host computer, initiating a transmission carrying the user data to the UE via a cellular network comprising the base station. The base station performs any of the steps of any of the embodiments described above for a base station.

In some embodiments, the method further comprising, at the base station, transmitting the user data.

In some embodiments, the user data is provided at the host computer by executing a host application. In this case, the method further comprises, at the UE, executing a client application associated with the host application.

Embodiments herein also include a user equipment (UE) configured to communicate with a base station. The UE comprises a radio interface and processing circuitry configured to perform any of the embodiments above described for a UE.

Embodiments herein further include a communication system including a host computer. The host computer comprises processing circuitry configured to provide user data, and a communication interface configured to forward user data to a cellular network for transmission to a user equipment (UE). The UE comprises a radio interface and processing circuitry. The UE's components are configured to perform any of the steps of any of the embodiments described above for a UE.

In some embodiments, the cellular network further includes a base station configured to communicate with the UE.

In some embodiments, the processing circuitry of the host computer is configured to execute a host application, thereby providing the user data. The UE's processing circuitry is configured to execute a client application associated with the host application.

Embodiments also include a method implemented in a communication system including a host computer, a base station and a user equipment (UE). The method comprises, at the host computer, providing user data and initiating a transmission carrying the user data to the UE via a cellular network comprising the base station. The UE performs any of the steps of any of the embodiments described above for a UE.

In some embodiments, the method further comprises, at the UE, receiving the user data from the base station.

Embodiments herein further include a communication system including a host computer. The host computer comprises a communication interface configured to receive user data originating from a transmission from a user equipment (UE) to a base station. The UE comprises a radio interface and processing circuitry. The UE's processing circuitry is configured to perform any of the steps of any of the embodiments described above for a UE.

In some embodiments the communication system further includes the UE.

In some embodiments, the communication system further including the base station. In this case, the base station comprises a radio interface configured to communicate with the UE and a communication interface configured to forward to the host computer the user data carried by a transmission from the UE to the base station.

In some embodiments, the processing circuitry of the host computer is configured to execute a host application. And the UE's processing circuitry is configured to execute a client application associated with the host application, thereby providing the user data.

In some embodiments, the processing circuitry of the host computer is configured to execute a host application, thereby providing request data. And the UE's processing circuitry is configured to execute a client application associated with the host application, thereby providing the user data in response to the request data.

Embodiments herein also include a method implemented in a communication system including a host computer, a base station and a user equipment (UE). The method comprises, at the host computer, receiving user data transmitted to the base station from the UE. The UE performs any of the steps of any of the embodiments described above for the UE.

In some embodiments, the method further comprises, at the UE, providing the user data to the base station.

In some embodiments, the method also comprises, at the UE, executing a client application, thereby providing the user data to be transmitted. The method may further comprise, at the host computer, executing a host application associated with the client application.

In some embodiments, the method further comprises, at the UE, executing a client application, and, at the UE, receiving input data to the client application. The input data is provided at the host computer by executing a host application associated with the client application. The user data to be transmitted is provided by the client application in response to the input data.

Embodiments also include a communication system including a host computer. The host computer comprises a communication interface configured to receive user data originating from a transmission from a user equipment (UE) to a base station. The base station comprises a radio interface and processing circuitry. The base station's processing circuitry is configured to perform any of the steps of any of the embodiments described above for a base station.

In some embodiments, the communication system further includes the base station.

In some embodiments, the communication system further includes the UE. The UE is configured to communicate with the base station.

In some embodiments, the processing circuitry of the host computer is configured to execute a host application. And the UE is configured to execute a client application associated with the host application, thereby providing the user data to be received by the host computer.

Embodiments moreover include a method implemented in a communication system including a host computer, a base station and a user equipment (UE). The method comprises, at the host computer, receiving, from the base station, user data originating from a transmission which the base station has received from the UE. The UE performs any of the steps of any of the embodiments described above for a UE.

In some embodiments, the method further comprises, at the base station, receiving the user data from the UE.

In some embodiments, the method further comprises, at the base station, initiating a transmission of the received user data to the host computer.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

The invention claimed is:

1. A host computer, comprising:
processing circuitry configured to provide user data; and
a communication interface configured to forward the user data to a cellular network for transmission to a user equipment (UE), wherein the cellular network comprises a network node configured to perform operations comprising:
acquiring radio access capability information of a wireless device, wherein the radio access capability information of the wireless device indicates radio access capabilities of the wireless device;
determining if the wireless communication network received the radio access capability information of the wireless device before access stratum security was activated for the wireless device; and
in response to determining that the wireless communication network received the radio access capability information of the wireless device before access stratum security was activated for the wireless device according to said determining, re acquiring the radio access capability information of the wireless device after access stratum security is activated for the wireless device.

2. The host computer of claim 1, wherein the operations further comprise determining whether or not to re acquire the radio access capability information of the wireless device after access stratum security is activated for the wireless device, depending respectively on whether or not the wireless communication network received the radio access capability information of the wireless device before access stratum security was activated for the wireless device.

3. The host computer of claim 1, wherein the operations further comprise determining whether or not to store the radio access capability information of the wireless device at the network node, depending respectively on whether the wireless communication network received the radio access capability information of the wireless device after or before access stratum security was activated for the wireless device.

4. The host computer of claim 1, wherein the operations further comprise determining whether or not to forward the radio access capability information of the wireless device from the network node to another network node, depending respectively on whether the wireless communication network received the radio access capability information of the wireless device after or before access stratum security was activated for the wireless device.

5. The host computer of claim 1, wherein re-acquiring the radio access capability information of the wireless device after access stratum security is activated for the wireless device comprises, after access stratum security is activated for the wireless device:
transmitting to the wireless device a capability enquiry which requests the radio access capability information of the wireless device; and
receiving the radio access capability information of the wireless device as a response to the capability enquiry.

6. The host computer of claim 1, wherein re-acquiring the radio access capability information of the wireless device comprises receiving the radio access capability information of the wireless device over a control plane connection after access stratum security is activated for securing the control plane connection.

7. The host computer of claim 6, wherein the control plane connection is a Radio Resource Control, RRC, connection.

8. The host computer of claim 1, wherein re-acquiring the radio access capability information of the wireless device after access stratum security is activated for the wireless device comprises retrieving the radio access capability information of the wireless device using a Radio Resource Control, RRC, User Equipment, UE, capability transfer procedure after successfully performing an Access stratum security Mode Command, SMC, procedure.

9. The host computer of claim 1, wherein the network node is a New Radio node B, gNB, a Next Generation Evolved Node B, ng-eNB or an Evolved Node B, eNB.

10. A non-transitory computer readable medium comprising instructions that, when executed by a processor in a host computer of a communication system, cause the host computer to perform operations comprising:
providing user data; and
forwarding the user data to a cellular network, via a communication interface, for transmission to a user equipment (UE), wherein the cellular network comprises a network node configured to perform operations comprising:
acquiring radio access capability information of a wireless device, wherein the radio access capability information of the wireless device indicates radio access capabilities of the wireless device;
determining if the wireless communication network received the radio access capability information of the wireless device before access stratum security was activated for the wireless device; and
in response to determining that the wireless communication network received the radio access capability information of the wireless device before access stratum security was activated for the wireless device according to said determining, re acquiring the radio access capability information of the wireless device after access stratum security is activated for the wireless device.

11. The non-transitory computer readable medium of claim 10, wherein the operations further comprise determining whether or not to re acquire the radio access capability information of the wireless device after access stratum security is activated for the wireless device, depending respectively on whether or not the wireless communication network received the radio access capability information of the wireless device before access stratum security was activated for the wireless device.

12. The non-transitory computer readable medium of claim 10, wherein the operations performed by the network node further comprise determining whether or not to store the radio access capability information of the wireless device at the network node, depending respectively on whether the wireless communication network received the radio access capability information of the wireless device after or before access stratum security was activated for the wireless device.

13. The non-transitory computer readable medium of claim 10, wherein the operations performed by the network node further comprise determining whether or not to forward the radio access capability information of the wireless device from the network node to another network node, depending respectively on whether the wireless communication network received the radio access capability information of the wireless device after or before access stratum security was activated for the wireless device.

14. The non-transitory computer readable medium of claim 10, wherein re-acquiring the radio access capability information of the wireless device after access stratum security is activated for the wireless device comprises, after access stratum security is activated for the wireless device:
  transmitting to the wireless device a capability enquiry which requests the radio access capability information of the wireless device; and
  receiving the radio access capability information of the wireless device as a response to the capability enquiry.

15. The non-transitory computer readable medium of claim 10, wherein re-acquiring the radio access capability information of the wireless device comprises receiving the radio access capability information of the wireless device over a control plane connection after access stratum security is activated for securing the control plane connection.

16. The non-transitory computer readable medium of claim 15, wherein the control plane connection is a Radio Resource Control, RRC, connection.

17. The non-transitory computer readable medium of claim 10, wherein re-acquiring the radio access capability information of the wireless device after access stratum security is activated for the wireless device comprises retrieving the radio access capability information of the wireless device using a Radio Resource Control, RRC, User Equipment, UE, capability transfer procedure after successfully performing an Access stratum security Mode Command, SMC, procedure.

18. The non-transitory computer readable medium of claim 10, wherein the network node is a New Radio node B, gNB, a Next Generation Evolved Node B, ng-eNB or an Evolved Node B, eNB.

19. A method performed by host computer in a communication system, comprising:
  providing user data; and
  forwarding the user data to a cellular network, via a communication interface, for transmission to a user equipment (UE), wherein the cellular network comprises a network node configured to perform operations comprising:
    acquiring radio access capability information of a wireless device, wherein the radio access capability information of the wireless device indicates radio access capabilities of the wireless device;
    determining if the wireless communication network received the radio access capability information of the wireless device before access stratum security was activated for the wireless device; and
    in response to determining that the wireless communication network received the radio access capability information of the wireless device before access stratum security was activated for the wireless device according to said determining, re acquiring the radio access capability information of the wireless device after access stratum security is activated for the wireless device.

20. The method of claim 19, wherein the operations performed by the network node further comprise determining whether or not to re acquire the radio access capability information of the wireless device after access stratum security is activated for the wireless device, depending respectively on whether or not the wireless communication network received the radio access capability information of the wireless device before access stratum security was activated for the wireless device.

21. A system, comprising:
  a host computer comprising processing circuitry configured to provide user data, and a communication interface configured to forward the user data to a cellular network for transmission to a user equipment (UE); and
  a network node disposed in the cellular network and configured to perform operations comprising:
  acquiring radio access capability information of a wireless device, wherein the radio access capability information of the wireless device indicates radio access capabilities of the wireless device;
  determining if the wireless communication network received the radio access capability information of the wireless device before access stratum security was activated for the wireless device; and
  if in response to determining that the wireless communication network received the radio access capability information of the wireless device before access stratum security was activated for the wireless device according to said determining, re acquiring the radio access capability information of the wireless device after access stratum security is activated for the wireless device.

22. The system of claim 21, wherein the operations further comprise determining whether or not to re acquire the radio access capability information of the wireless device after access stratum security is activated for the wireless device, depending respectively on whether or not the wireless communication network received the radio access capability information of the wireless device before access stratum security was activated for the wireless device.

23. The system of claim 21, wherein the operations further comprise determining whether or not to store the radio access capability information of the wireless device at the network node, depending respectively on whether the wireless communication network received the radio access capability information of the wireless device after or before access stratum security was activated for the wireless device.

24. The system of claim 21, wherein the operations further comprise determining whether or not to forward the radio access capability information of the wireless device from the network node to another network node, depending respectively on whether the wireless communication network received the radio access capability information of the wireless device after or before access stratum security was activated for the wireless device.

25. The system of claim 21, wherein re-acquiring the radio access capability information of the wireless device after access stratum security is activated for the wireless device comprises, after access stratum security is activated for the wireless device:
- transmitting to the wireless device a capability enquiry which requests the radio access capability information of the wireless device; and
  - receiving the radio access capability information of the wireless device as a response to the capability enquiry.

26. The system of claim 21, wherein re-acquiring the radio access capability information of the wireless device comprises receiving the radio access capability information of the wireless device over a control plane connection after access stratum security is activated for securing the control plane connection.

27. The system of claim 26, wherein the control plane connection is a Radio Resource Control, RRC, connection.

28. The system of claim 21, wherein re-acquiring the radio access capability information of the wireless device after access stratum security is activated for the wireless device comprises retrieving the radio access capability information of the wireless device using a Radio Resource Control, RRC, User Equipment, UE, capability transfer procedure after successfully performing an Access stratum security Mode Command, SMC, procedure.

29. The system of claim 21, wherein the network node is a New Radio node B, gNB, a Next Generation Evolved Node B, ng-eNB or an Evolved Node B, eNB.

* * * * *

UNITED STATES PATENT AND TRADEMARK OFFICE
CERTIFICATE OF CORRECTION

PATENT NO. : 11,115,822 B2  
APPLICATION NO. : 17/160117  
DATED : September 7, 2021  
INVENTOR(S) : Ohlsson et al.

Page 1 of 1

It is certified that error appears in the above-identified patent and that said Letters Patent is hereby corrected as shown below:

In the Specification

In Column 28, Line 59, delete "$K_gNB$" and insert -- $K_{gNB}$ --, therefor.

Signed and Sealed this  
Nineteenth Day of April, 2022

Katherine Kelly Vidal  
*Director of the United States Patent and Trademark Office*